(12) United States Patent
Takaoka

(10) Patent No.: US 6,473,535 B1
(45) Date of Patent: Oct. 29, 2002

(54) IMAGE PROCESSING APPARATUS AND METHOD

(75) Inventor: Naoki Takaoka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/286,907

(22) Filed: Apr. 6, 1999

(30) Foreign Application Priority Data

Apr. 6, 1998 (JP) .......................................... 10-093004
Feb. 17, 1999 (JP) .......................................... 11-038148

(51) Int. Cl.$^7$ ................................................. G06K 9/40
(52) U.S. Cl. ...................... 382/274; 382/254; 358/443; 358/448
(58) Field of Search ................................ 382/274, 254; 358/443, 448, 453, 455, 458, 468, 527, 530, 538

(56) References Cited

U.S. PATENT DOCUMENTS

| | | | | |
|---|---|---|---|---|
| 5,081,529 A | * | 1/1992 | Collette | 358/504 |
| 5,930,009 A | * | 7/1999 | Sato et al. | 358/518 |
| 6,122,006 A | * | 9/2000 | Bogdanowicz et al. | 348/222 |
| 6,204,940 B1 | * | 3/2001 | Lin et al. | 358/527 |
| 6,243,174 B1 | * | 6/2001 | Fukasawa | 358/530 |
| 6,246,494 B1 | * | 6/2001 | Tatsumi | 358/522 |
| 6,271,938 B1 | * | 8/2001 | Hikita | 358/443 |

* cited by examiner

Primary Examiner—Thomas D. Lee
(74) Attorney, Agent, or Firm—Birch, Stewart, Kolasch & Birch, LLP

(57) ABSTRACT

An image processing apparatus and method in which proper image processing conditions can be realized by simple operation, even in cases in which it is difficult to automatically obtain proper image processing conditions. A film image recorded on a photographic film is read, and is analyzed based on the image data obtained by reading. Processing conditions for various types of image processings for the image data are calculated. In a process of verifying the calculated processing conditions, if an operator designates correction of density or color balance, the image data is corrected in accordance with the designated correction, the image is reanalyzed based on corrected image data, and processing conditions for image processing, e.g., hyper gradation processing, are recalculated automatically.

7 Claims, 19 Drawing Sheets

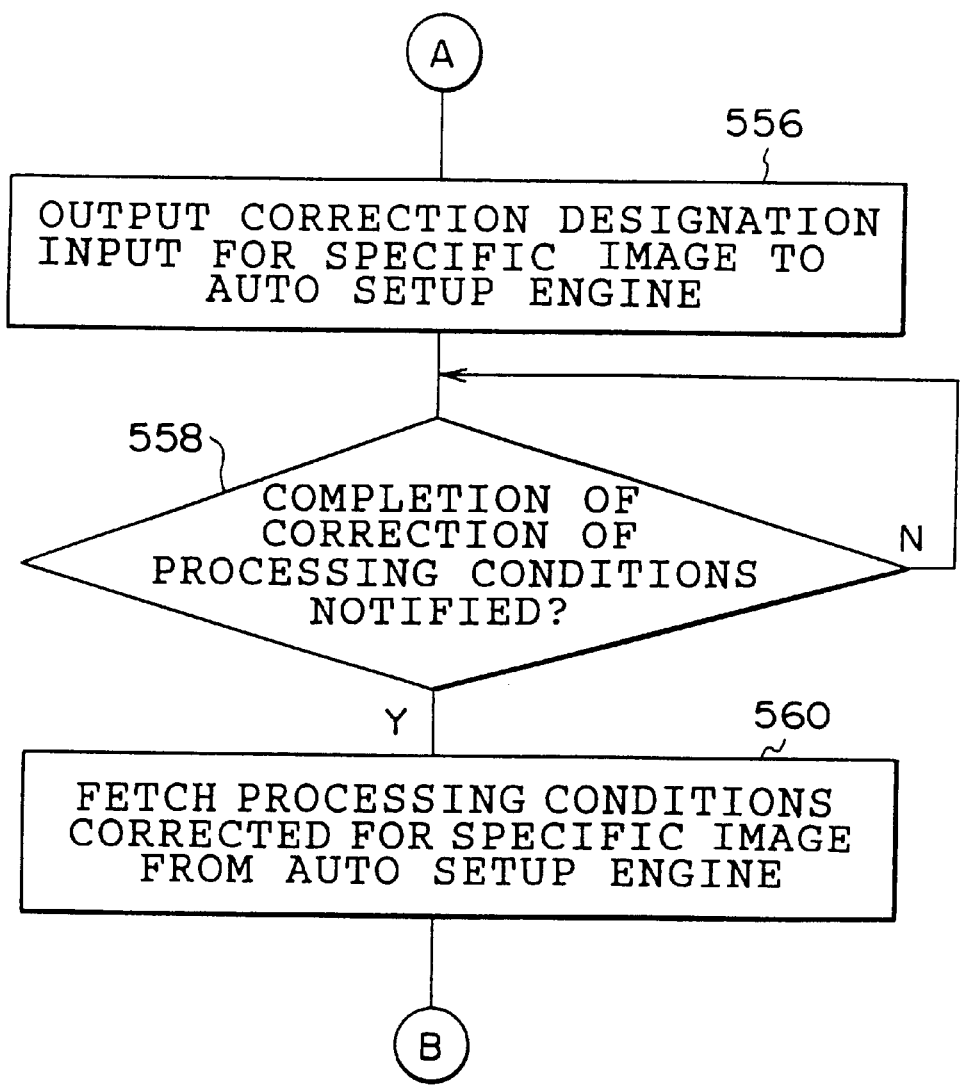

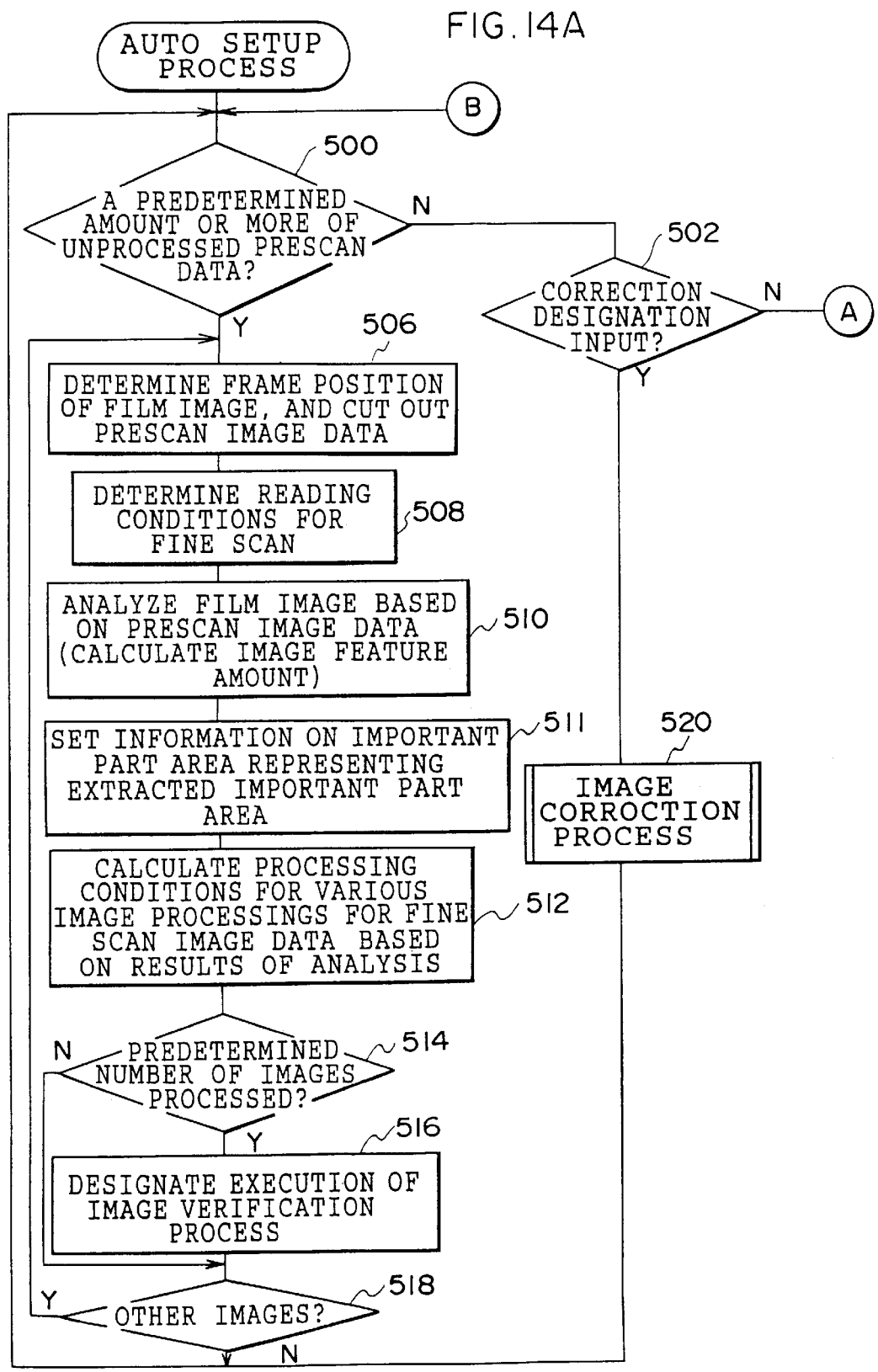

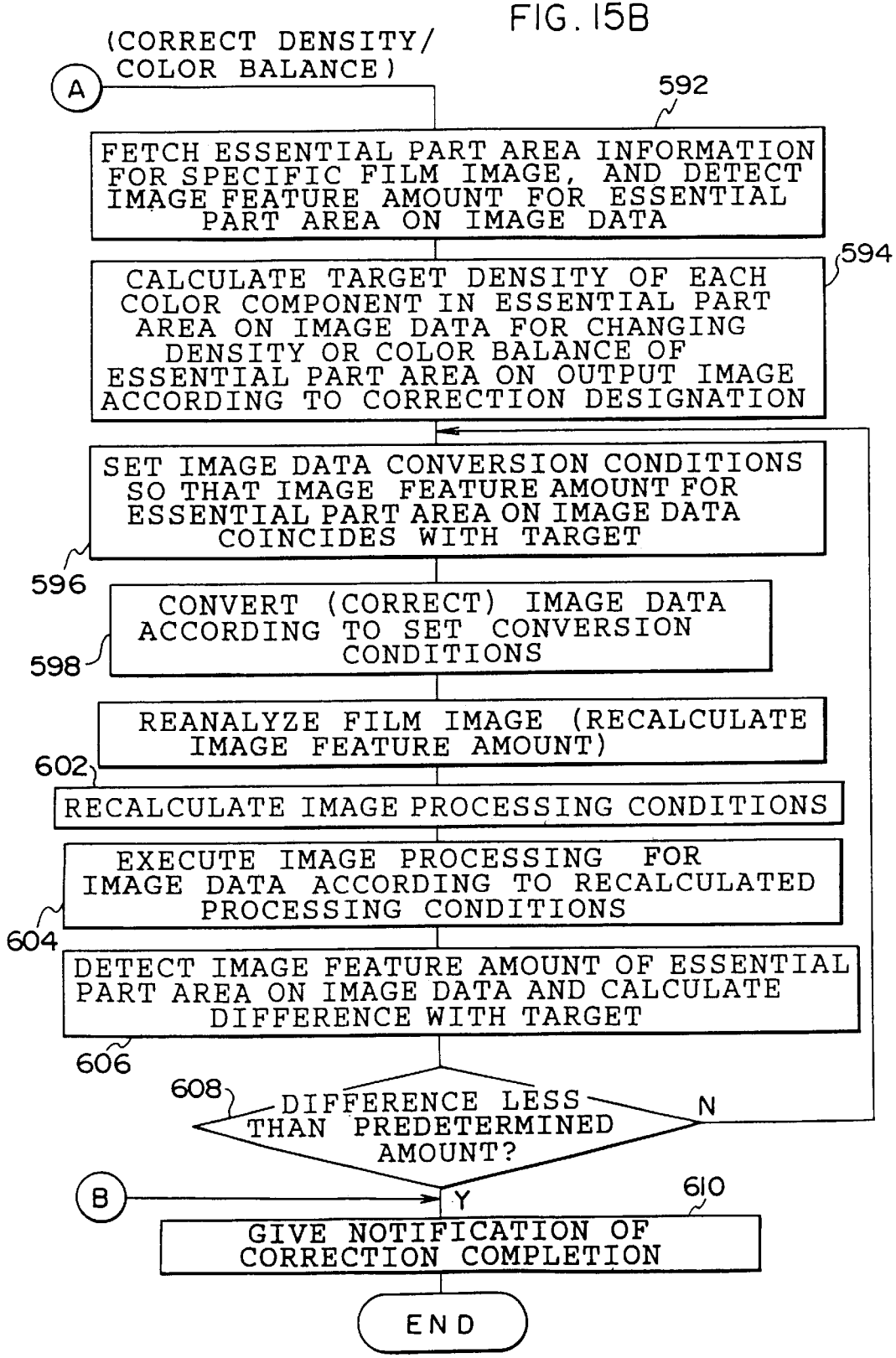

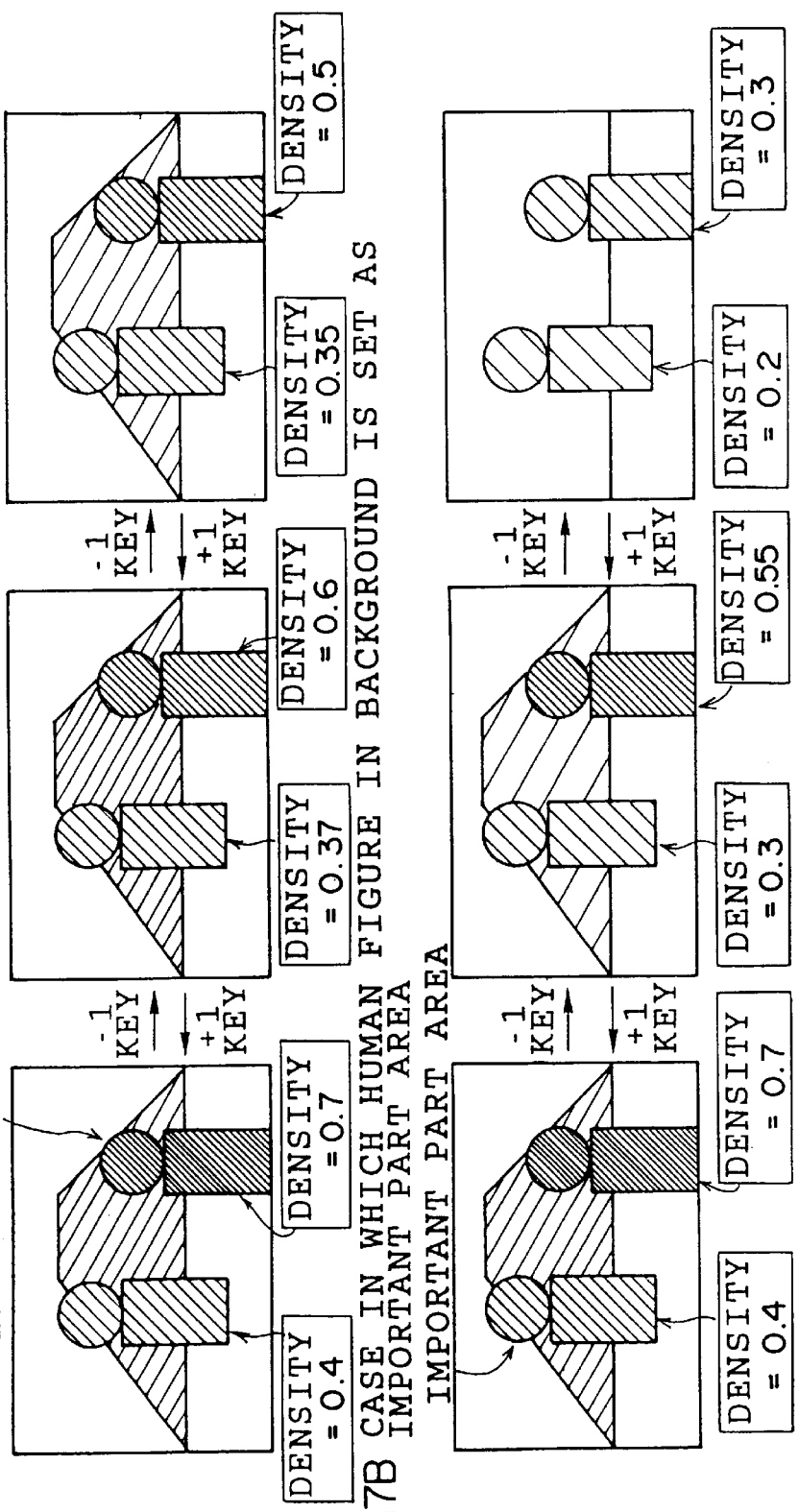
FIG.17A CASE IN WHICH HUMAN FIGURE IN FOREGROUND IS SET AS IMPORTANT PART AREA
FIG.17B CASE IN WHICH HUMAN FIGURE IN BACKGROUND IS SET AS IMPORTANT PART AREA

IMAGE PROCESSING APPARATUS AND METHOD

BACKGROUND OF THE INVENTION

1. Field of the Invention

The present invention relates to an image processing apparatus and method, and in particular, to an image processing method for analyzing an image, calculating image processing conditions based on the results of analysis, and processing the image in accordance with the processing conditions calculated, and to an image processing apparatus to which the image processing method is applicable.

2. Description of the Related Art

A conventional image processing system is known in which a film image recorded on a photographic film is read by a film reading device including a read sensor such as a CCD sensor, and the image data obtained by reading is subjected to various types of image processing, and based on the image data thus processed, the image is recorded onto a recording material. In this image processing system, as compared with a conventional photographic processing system for recording a film image onto a photographic paper by planar exposure, the quality of the recorded image can be freely controlled by processing the image data. For example, if a film image photographed by using a flash or a film image which is a photographed backlit scene is subjected to a so-called hyper gradation process for compressing the gradation of the low-frequency components of the image, a recorded image free of a loss in gradation detail in shade area and highlight area in the background regions can be obtained without making the whole image soft gradation.

The contents of film images are varied, and the image processing conditions for image processing (the density conversion conditions for the density conversion process, the gradation compression conditions for the hyper gradation process, etc.) for producing a recorded image of a proper quality vary from one film image to another. In the image processing system described above, therefore, auto setup calculation is carried out for each film image unit. In auto setup calculation, the film image is read preliminarily (prescanned) with a comparatively low resolution, and then the film image is officially read with a high resolution (fine scanned). The film image is analyzed based on the image data obtained by the prescan, and the processing conditions for various image processings are calculated for producing a recorded image with a proper quality. The image data obtained by the fine scan is processed in various ways in accordance with the processing conditions calculated in the auto setup calculation.

With the algorithm for the auto setup calculation described above, proper processing conditions can be obtained for a great majority of film images. Nevertheless, the percentage of obtaining proper processing conditions has not yet reached 100%, and there are cases in which proper processing conditions cannot be obtained depending on the contents of the film image.

For this reason, a recorded image obtained by image processing according to the parameters calculated by the auto setup calculation is estimated based on prescanned image data and displayed as a simulation image. An operator verifies the quality of the simulation image, i.e., determines whether the processing conditions calculated by the auto setup calculation are proper or not. In the case where the operator determines that the quality of the simulation image is not proper (i.e., in the case where the operator determines that the auto setup calculation has ended in failure), the operator directly adjusts the processing conditions for a specific image processing.

In the image processing system described above, in order to produce recorded images with proper quality from film images having various contents, various image processings are available for controlling the quality of the recorded image. However, in the case where the auto setup calculation ends in failure, the operator often finds it difficult to determine which processing conditions of image processings should be adjusted. Also, complicated image processings such as the hyper gradation process require, for the operator, considerable knowledge and experience to determine how to adjust the processing conditions. Thus, the operator has hitherto adjusted the processing conditions for various image processings by trial and error. Therefore, in the case where the auto setup calculation has failed, a great burden is imposed on the operator, and there is also the problem that the processing speed of the image processing system is slow.

SUMMARY OF THE INVENTION

The object of the present invention, which has been developed in view of the facts described above, is to provide an image processing apparatus and method in which proper image processing conditions can be obtained by simple operation even in cases in which it is difficult to obtain proper image processing conditions automatically.

In order to achieve the above-mentioned object, according to a first aspect of the invention, there is provided an image processing apparatus comprising calculating means for analyzing an image and for, based on the results of analysis, calculating processing conditions for plural types of image processings for image data representing the analyzed image, image processing means for performing each of the plural types image processings on inputted input image data in accordance with the processing conditions calculated by the calculating means, and input means for inputting information designating a change in the processing conditions of a specific image processing among the processing conditions calculated by the calculating means, wherein in a case in which the information designating a change in the processing conditions of a specific image processing scheme is input to said calculating means through said input means, said calculating means changes the processing conditions for the specific image processing, analyzes the image again in such a manner as to reflect said designation to change the processing conditions, and recalculates the processing conditions for at least one image processing other than the specific image processing on the basis if the results of analysis.

The calculating means in the first aspect of the invention analyzes the image and calculates the processing conditions for a plurality of image processing for the image data representing the analyzed image based on the results of analysis. The image can be analyzed and the processing conditions can be calculated specifically by determining the average density or other various image feature amounts using the image data representing the image to be processed, for example, and in accordance with the image feature amounts thus determined. In this way, proper image processing conditions for a plurality of image processing can be obtained automatically in accordance with the contents of the image data for a great majority of images. The image processing means also carries out a plurality of image processing on the image data input thereto in accordance with the processing conditions calculated by the calculating means. The image data on which a plurality of image processing are performed by the image processing means may be either the same image data as those used by the calculating means for image analysis or the image data of higher resolution. As described above, by performing a plurality of image processings in accordance with the processing conditions calculated by the calculating means, the image data for a great majority of images can be processed by a plurality of image processings under various proper processing conditions.

The existing algorithm for calculating the processing conditions for image processing cannot achieve 100% performance of the proper processing conditions. Depending on the contents of the image to be processed, therefore, the density or color tint of the important part area of the image represented by the image data after image processing may not be proper, or otherwise proper processing conditions may not be obtained. In view of this, the first aspect of the invention comprises input means for inputting information designating a change in the processing conditions for a specific image processing among the processing conditions calculated by the calculating means. In the case where information designating a change in the processing conditions for a specific image processing is input to the calculating means through the input means, the calculating means changes the processing conditions for the specific image processing, analyzes the image again in such a manner as to reflect the designation of the change in the processing conditions, and recalculates the processing conditions for at least one image processing other than the specific image processing based on the results of the reanalysis.

As a result, if the operator determines that the processing conditions calculated by the calculating means are not proper and inputs through the input means information designating a change in the processing conditions of the specific image processing, the image is analyzed again in such a manner as to reflect the designation of the change in the processing conditions. The processing conditions for at least one image processing other than the specific image processing are converted into proper processing conditions by the recalculation in the calculating means in such a manner as to reflect the designation for a change in the processing conditions of the specific image processing. Also, direct adjustment by the operator of the processing conditions recalculated is not required to attain the proper quality of the image represented by the image data after image processing.

According to the first aspect of the invention, therefore, proper image processing conditions, which may be difficult to automatically attain, can be realized by the simple operation of inputting information designating a change in a specific parameter.

The specific image processing described above preferably is one in which the quality of the important part area of the image can be controlled by changing the processing conditions and the operator can readily determine the extent to which the processing conditions are to be changed, e.g., the density conversion process according to the third aspect of the invention in which the density (which may be either the average density of the component colors (R, G, B, for example) or the density of each component color) of the image represented by the image data is converted in accordance with the density conversion conditions.

If the density conversion conditions are changed, the density or the color balance is changed over the entire image including the important part area thereof. Therefore, on the basis of, for example, the image quality (density, color tint, etc.) of the important part area (such as the area corresponding to a human face in the image), of the image, the operator can easily determine the manner in which the density conversion conditions are to be changed to attain a proper image quality of the important part area. Thus, by using density conversion processing as the specific image processing, the burden on the operator during input of information designating a change in processing conditions can be reduced even more.

Also, the image processing which can be used for recalculating the processing conditions may be, for example, an image processing in which the proper processing conditions for a specific image processing vary in accordance with the results of image analysis. When the density conversion conditions are changed in the density conversion processing described above, for example, the image density range also changes. The proper processing conditions (the gradation compression conditions in this case) also change for hyper gradation processing in which the gradation of the low-frequency component of the image is compressed in order to maintain the image density within a predetermined range. In the case where the density conversion processing is used as the specific image processing, for example, hyper gradation processing can be used as the image processing for recalculating the processing conditions as in the third aspect of the invention.

The verification work by the operator to determine whether the processing conditions calculated by the calculating means are proper or not or to determine the extent to which the processing conditions for a specific image processing are to be changed may be accomplished, for example, by recording the image on a recording material using the image data processed by the image processing means, and the operator referring to the recorded image. However, in such a case, the amount of recording material used is increased and a considerable time is taken before finishing the image recorded on the recording material, thereby resulting in a considerable increase in the processing time. In view of this, according to the second aspect of the invention, an image display means is added to the first aspect of the invention, and a display control means is used to carry out the plural types of image processings on the image data in accordance with the processing conditions calculated by the calculating means. The image represented by the processed image data is displayed on the display means.

The image data processed by the display control means may be either the same image data as the one on which the plural types of image processings are performed by the image processing means, or may be image data representing the same image with a lower resolution. According to the second aspect of the invention, the operator is not required to wait until the image recorded in the recording material is finished, and the verification work described above can be carried out by the operator referring to the image displayed on the display means. Thus, the processing time can be shortened. Also, increased consumption of recording material is suppressed.

The display control means may be structured such that in the case where information designating a change in the processing conditions for a specific image processing is input, a plurality of image processings are carried out in accordance with the various processing conditions including those changed or recalculated by the calculating means, and the image is redisplayed on the display means. As a result, the operator can easily determine by referring to the image redisplayed on the display means whether the input change designation is proper or not, and also whether the image processing corresponding to the recalculated processing conditions has been changed to proper processing conditions or not.

According to a third aspect of the invention, in the image processing apparatus of the first aspect, the plural types of image processings include density conversion processing for converting the density of the image represented by the image data in accordance with density conversion conditions, and hyper gradation processing for compressing the gradation of low-frequency components of the image in accordance with gradation compression conditions, and wherein in a case in which information, which designates a change in said density conversion conditions in such a manner that the density of the image represented by the image data which has been subjected to the density conversion processing changes by a predetermined amount, is input to said calculating means through said input means, said calculating means changes the density by a predetermined amount for the image data representing the image to be processed, reanalyzes the image to be processed, and recalculates the gradation compression conditions for hyper gradation processing based on the results of analysis.

For example, in an image obtained by photographing a backlit scene, the important part area thereof generally has improper image quality in that it is low in brightness (high density). In the case where the proper processing conditions cannot be obtained by the operation of the calculating means, the image quality of the important part area may often fail to be improved even after the image is subjected to various image processings such as the hyper gradation processing in accordance with the calculated processing conditions. If the density conversion processing is used as the specific image processing and the density conversion conditions can be changed through the input means, as long as information is input designating the change in the density conversion conditions in such a manner that the density of the image represented by the image data after density conversion processing changes by a predetermined amount (e.g., the density shifts toward a lower density by a predetermined amount), the proper image quality of the important part area of the image represented by the image data after image processing can be attained by the calculating means changing the density conversion conditions in accordance with the designation for change. In spite of this, however, the gradation in the background area of the image may fail to attain a proper level.

In contrast, in the third aspect of the invention, if information, which designates a change in the density conversion conditions in such a manner that the density of the image represented by the image data after density conversion process changes by a predetermined amount, is input through the input means, the image to be processed which is represented by the image data is analyzed again by changing the density thereof by a predetermined amount in accordance with the change designation, and the gradation compression conditions for hyper gradation processing are calculated based on the results of analysis. Thus, the processing conditions for the hyper gradation processing are calculated in such a manner as to not cause a loss in gradation detail in the background area. Therefore, even in cases in which a change in the density conversion conditions is designated in such a manner that the density after density conversion processing is changed by a predetermined amount, proper processing conditions of hyper gradation processing can be attained, and the image represented by the image-processed image data can be produced with proper quality.

A change in the density conversion conditions is often designated for the purpose of adjusting the density of the important part area (the area on which attention is focused) in the image to a desired level. If, in addition to the density conversion processing, gradation change processing (such as the hyper gradation processing in the third aspect of the invention) is performed for changing the gradation of the image for the image data in accordance with the gradation conversion conditions, the density of the image corresponding to the image data, which should inherently change uniformly by a predetermined amount corresponding to the density conversion conditions, fails to change by the same amount as the above-mentioned predetermined amount due to gradation conversion processing. At the same time, the density changes becomes uneven in various parts of the image (for example, the density changes at the important part area and the non-important part area in the image do not coincide). In this way, there is the possibility that the density of the important part area in the image may not be adjusted to the desired density level.

The density conversion conditions are often changed in such a manner that, while the image (simulation image) obtained by image processing according to the currently set processing conditions is displayed on the display unit or the like, the operator repeatedly presses a density correction key designating an increase or decrease in the image density by a predetermined amount and checks the change in image quality, e.g., the density, of the simulation image which change accompanies the input of the designation. However, in this case, when the gradation change processing is performed in addition to the density conversion processing, the density change amount (especially the density change amount in the important part area) of the image upon each pressing of the density correction key may fail to coincide with the density change amount in the absence of the gradation change processing, resulting in the operator having a feeling of sense of incongruity or extremely increased complexity of the designation operation for attaining the desired density of the important part area by operating the density correction key.

In view of the foregoing facts, according to a fourth aspect of the invention, the image processing apparatus of the first aspect further comprises means for detecting an essential part area of an image, wherein said image processing means performs plural types of image processings including density conversion processing for converting the density of the image represented by the image data in accordance with density conversion conditions, and gradation change processing for changing the gradation of the image in accordance with gradation change conditions, and wherein in a case in which information, which designates a change in the density conversion conditions in such a manner that the density of the image corresponding to the image data which has been subjected to the density conversion processing changes by a predetermined amount, is input to said calculating means through said input means, said calculating means changes the density conversion conditions for the density conversion processing and recalculates the gradation change conditions for the gradation change processing in such a manner that the density of the essential part area of the image corresponding to the image data which has been subjected at least to the density conversion processing and the gradation change processing changes by said predetermined amount.

In the fourth aspect of the invention, the important part area in the image is detected by the detection means. Also, when information, which designates a. change in the density conversion conditions in such a manner that the density of the image corresponding to the image data after density conversion processing changes by a predetermined amount, is inputted to the calculating means of the fourth aspect, the calculating means changes the density conversion conditions for the density conversion process and recalculates the gradation change conditions for the gradation change processing in such a manner that the density of the important part area in the image corresponding to the image data subjected to at least the density conversion processing and the gradation change processing changes by a predetermined amount.

Another example, in addition to hyper gradation processing, of gradation change processing for changing the image gradation in accordance with the gradation change conditions is face expression improvement processing for changing the gradation (density) of only the area corresponding to the human face in the image. Face expression improvement processing can attain the proper gradation of the human face.

In the fourth aspect of the invention, in an image based on image data which has been subjected to density conversion processing and gradation change processing, the amount of change in density of the image due to the carrying out of the density conversion processing is not uniform in the respective portions of the image, but the density of the important part area changes by a predetermined amount corresponding to the designation of the change in the density conversion conditions. It is therefore easy to designate a change in the density conversion conditions in such a manner as to adjust the density of the important part area in the image to a desired density. By repeatedly designating changes in the change of the density conversion conditions, for example, it is possible to prevent the operator from having a sense of incongruity or to prevent the operation of adjusting the important part area in the image to the desired density from becoming complicated.

The density of the important part area in the image may change both in the case of a change in the density conversion conditions of the density conversion processing and in the case of a change in the gradation change conditions of the gradation change processing. Also, the change in the density conversion conditions and the change in the gradation change conditions a affect each other. For this reason, the change in the density conversion conditions and the recalculation of the gradation change conditions by the calculating means according to the fourth aspect of the invention can be realized, as described in the fifth aspect, by changing the density conversion conditions in accordance with the designation for changing the density conversion conditions, reanalyzes the image to be processed by changing the density by a predetermined amount for the image data representing the image to be processed, and recalculates the gradation change conditions for the gradation change processing based on the results of analysis, and thereafter, said calculating means determines the density of the important part area of the image corresponding to the image data subjected to the density conversion processing and the gradation change processing, and , until the density change amount of the important part area substantially coincides with said predetermined amount, said calculating means repeats the processes of changing the density conversion conditions, analyzing the image to be processed, and recalculating the gradation change conditions, in order for the density change amount of the important part area to substantially coincide with the predetermined amount.

As described above, the processes of changing the density conversion conditions in such a manner that the density change amount for the important part area substantially coincides with a predetermined value, analyzing the image to be processed, and recalculating the gradation change conditions are repeated until the density change amount of the important part area substantially comes to coincide with the predetermined amount. In this way, the density conversion conditions and the gradation change conditions can be made to converge to the proper conditions (i.e., the conditions that the change amount of the density of the important part area of the image corresponding to the image data subjected to the density conversion processing and the gradation change processing can be made to coincide substantially with a predetermined amount, and that the image gradation can be changed to the proper gradation).

Also, the important part area detected by the detecting means, as specifically described in the sixth aspect of the invention, by analyzing the image and estimating the important part area in the image or by detecting the area designated through the input means as the important part area. In the case where the important part area is detected by analyzing the image and estimating the important part area in the image, the operator is not required to carry out the operation of designating the important part area in the image, and therefore, labor is saved. In the case where the area designated through the input means is detected as the important part area in the image, erroneous detection of the important part area can be prevented.

The detection means described above may either detect the important part area by estimating an important part area in the image or detect area designated as an important part area. Normally, however, it is preferable to detect the important part area by estimating an important part area. In the case where the area is designated through the input means, the area designation is given priority so that the designated area is detected as the important part area. As a result, the increase in the burden on the operator is minimized, while at the same time, the important part area in the image has a high probability of being detected correctly.

According to a seventh aspect of the invention, there is provided an image processing method comprising the steps of analyzing an image and, on the basis of the results of analysis, calculating the processing conditions for plural types of image processings for image data representing the analyzed image, carrying out the plural types of image processings on inputted image data in accordance with the calculated processing conditions, and upon receipt of information designating a change in the calculated processing conditions for a specific image processing, changing the processing conditions for said specific image processing, reanalyzing the image in such a manner as to reflect the designation to change the processing conditions, and on the basis of the results of analysis, recalculating the processing conditions for at least one image processing other than said specific image processing.

BRIEF DESCRIPTION OF THE DRAWINGS

FIG. 8B is a flowchart showing image verification processing executed by a personal computer.

FIG. 14A is a flowchart showing auto setup processing according to a second embodiment.

FIG. 15B is a flowchart showing image correction processing according to the second embodiment.

FIG. 17A is an imaginary diagram for explaining the change in image density when a density correction key is pressed in the case where an area corresponding to a human figure in the foreground of an image is defined as the important part area according to the second embodiment, and FIG. 17B is an imaginary diagram for explaining the change in image density when the density correction key is pressed in the case where an area corresponding to a human figure in the background of an image is defined as the important part area according to the second embodiment.

DESCRIPTION OF THE PREFERRED EMBODIMENTS

Embodiments of the present invention will be described below with reference to the accompanying drawings.

First Embodiment

First, an explanation will be given of a digital laboratory, system to which the present invention is applicable.

(General Structure of Overall System)

Figure 1:
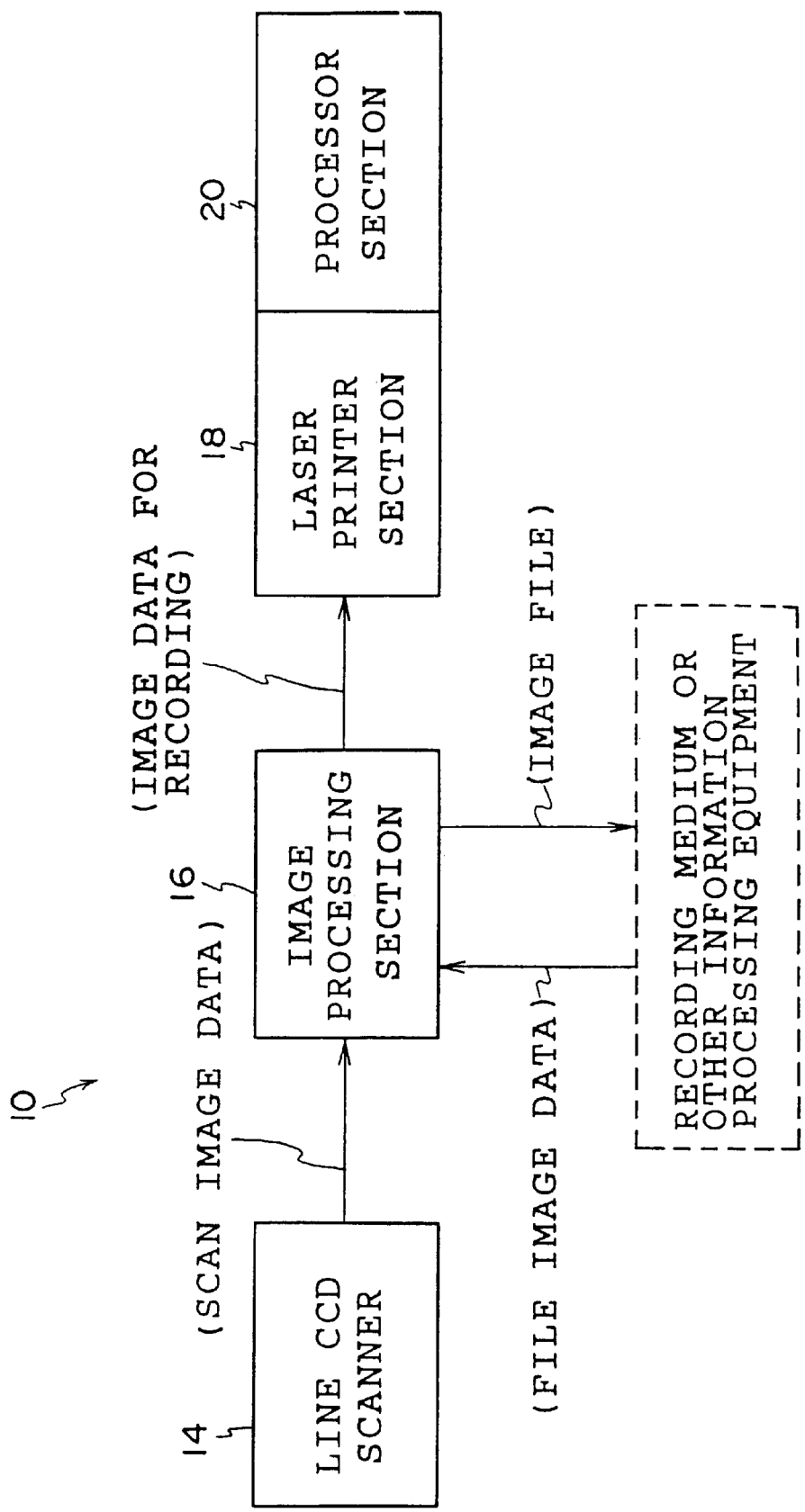
FIG. 1 is a block diagram schematically showing a digital laboratory system according to an embodiment.
Figure 2:
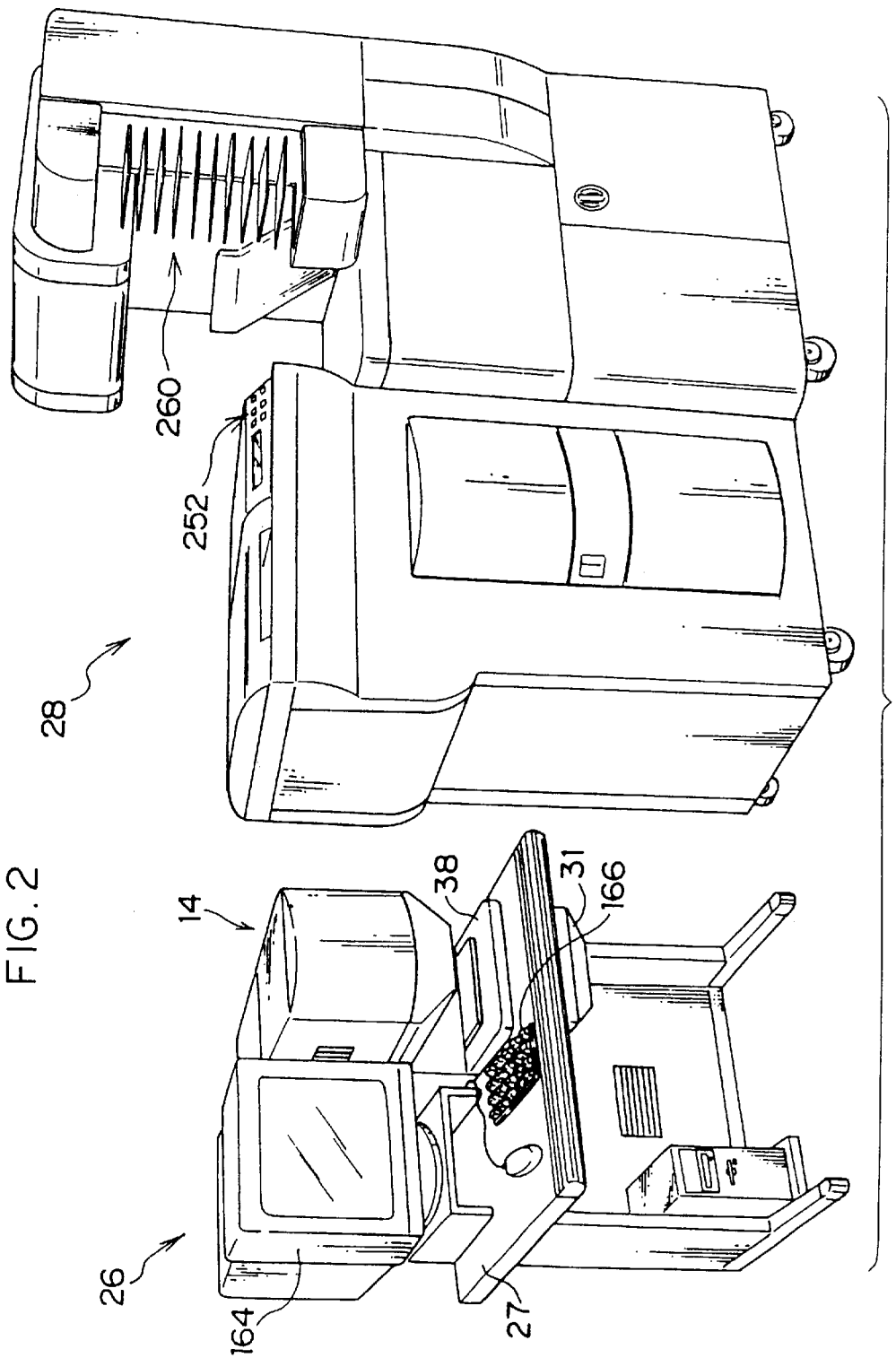
FIG. 2 is a perspective view showing the exterior of the digital laboratory system.

FIG. 1 shows a general structure of a digital laboratory system 10 according to the present embodiment. FIG. 2 shows the exterior of the digital laboratory system 10. As shown in FIG. 1, the laboratory system 10 includes a line CCD scanner 14, an image processing section 16, a laser printer section 18 and a processor section 20. The line CCD scanner 14 and the image processing section 16 are integrated with each other as an input section 26 shown in FIG. 2, while the laser printer section 18 and the processor section 20 are integrated with each other as an output section 28 shown in FIG. 2.

The line CCD scanner 14 is for reading the film image recorded on a photographic film such as a negative film or a reversal film. The images can be read by the line CCD scanner 14 from a 135-size photographic film, a 110-size photographic film, a photographic film formed with a transparent magnetic layer (240-size photographic film, also called "APS film") and 120-size and 220-size photographic films. The line CCD scanner 14 reads the film image by a three-line color CCD and outputs the image data of R, G, B. The image processing section 16 is supplied with the image data (scan data) output from the line CCD scanner 14, and is also adapted to be supplied from an external source with the image data picked up by the digital camera, the image data obtained by reading an original (such as a reflection original) other than the film image by the scanner and the image data generated by the computer (hereinafter collectively called the file image data). Such image data can be supplied through a recording medium such as a memory card or from other information processing equipment through a communication line.

The image processing section 16 performs various image processings such as the correction of the input image data and outputs the resulting recording image data to the laser printer unit 18. Also, the image processing unit 16 can output the processed image data to an external unit as an image file (it can apply the output, for example, to a recording medium such as a memory card or to other information processing equipment through a communication line).

The laser printer section 18 is equipped with a laser light source of R, G, B, irradiates the photographic paper with the laser beam modulated in accordance with the recording image data input from the image processing section 16, and records an image on the photographic paper by scan exposure. The processor section 20 performs various processing operations such as color development, bleach-fixing, washing in water and drying of the photographic paper having an image recorded thereon by scan exposure in the laser printer section 18.

(Structure of Image Processing Section)

Figure 3:
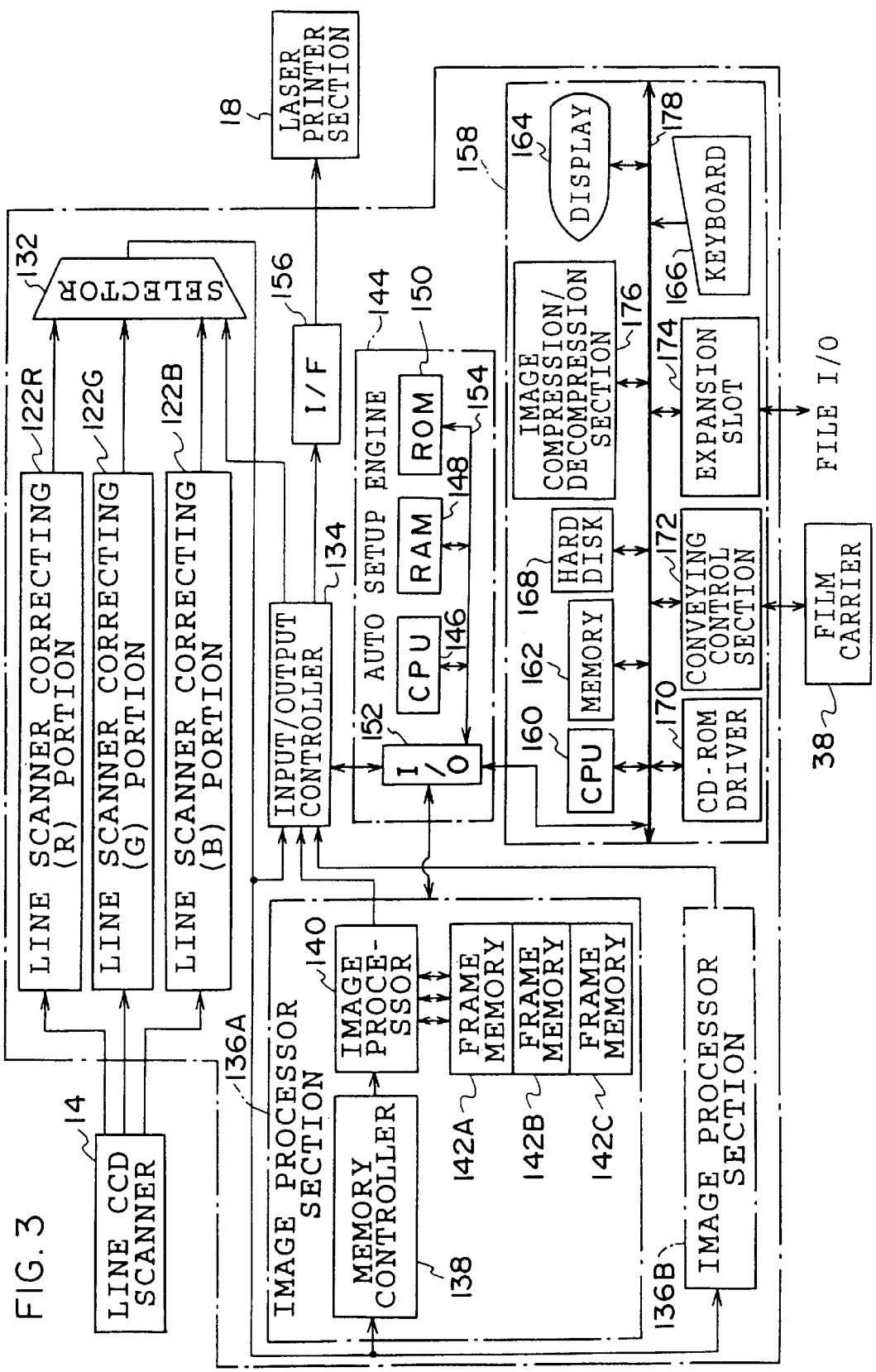
FIG. 3 is a block diagram showing a general structure of an image processing section.

The structure of the image processing section 16 will now be explained with reference to FIG. 3. The image processing section 16 includes line scanner correction sections 122R, 122G, 122B corresponding to the R, G, B data input from the line CCD scanner 14. The line scanner correction sections 122R, 122G, 122B have the same structure, and hereinafter will be collectively called the line scanner correction section 122.

The line scanner correction section 122 performs various processing operations including dark correction, density conversion, shading correction and correction of defective pixels, on the scan data input from the line CCD scanner 14. In the dark correction process, the data (representing the dark output level of each cell of the line CCD) input from the line CCD scanner 14 with the light incidence side of the line CCD of the line CCD scanner 14 being shaded are stored for each cell. The photographic film is read by the line CCD, and the dark output level corresponding to each pixel is reduced from the scan data input from the line CCD scanner 14.

The line scanner correction section 122 has a lookup table (LUT) for storing the data for logarithmic transformation. The density conversion described above is accomplished in such a manner that the data (representing the light amount incident onto the line CCD) subjected to the dark correction is converted into data indicating the density of the photographic film set in the line CCD scanner 14 by the LUT described above. Also, the line scanner correction section 122 has stored therein the data (shading data) obtained by uniform light entering each cell of the line CCD in a state in which the photographic film is not set in the line CCD scanner 14. The shading correction described above is accomplished in such a manner that the density-converted data is corrected pixel by pixel based on the shading data at the time of reading the photographic film.

Due to the considerations regarding yield at the time of manufacture thereof, the CCD sensor may include cells incapable of outputting a signal corresponding exactly to the light amount of the incident light (what are called defective pixels), or defective pixels may develop over time. The line scanner correction section 122, therefore, determines the presence or absence of defective pixels in advance, and in the presence of a defective pixel, stores the address of the particular defective pixel. Among the shading-corrected data, data on the defective pixel is interpolated from the data for the surrounding pixels to thereby generate new data (correction of defective pixels).

The output terminal of the line scanner correction section 122 is connected to the input terminal of the selector 132. The data subjected to various processing operations including dark correction, density conversion, shading correction and the correction of defective pixels in the line scanner correction section 122 are input to the selector 132 as scan data. The input terminal of the selector 132 is connected also to the data output terminal of an input/output controller 132, from which the file image data input from an external source is supplied to the selector 132. The output terminal of the selector 132 is connected to the data input terminals of the input/output controller 134 and the image processor sections 136A, 136B. The selector 132 can selectively output the input image data to the input/output controller 134 and the image processor sections 136A, 136B.

The image processor section 136A includes a memory controller 138, an image processor 140 and three frame memories 142A, 142B, 142C. The frame memories 142A, 142B, 142C each have a capacity capable of storing image data of the film image of one frame. The image data input from the selector 132 is stored in one of the three frame memories 142. The memory controller 138 controls the address of the frame memory 142 for storing the image data in such a manner that the data on the pixels of the input image data are stored in a predetermined sequence in the storage area of the frame memory 142.

Figure 4:
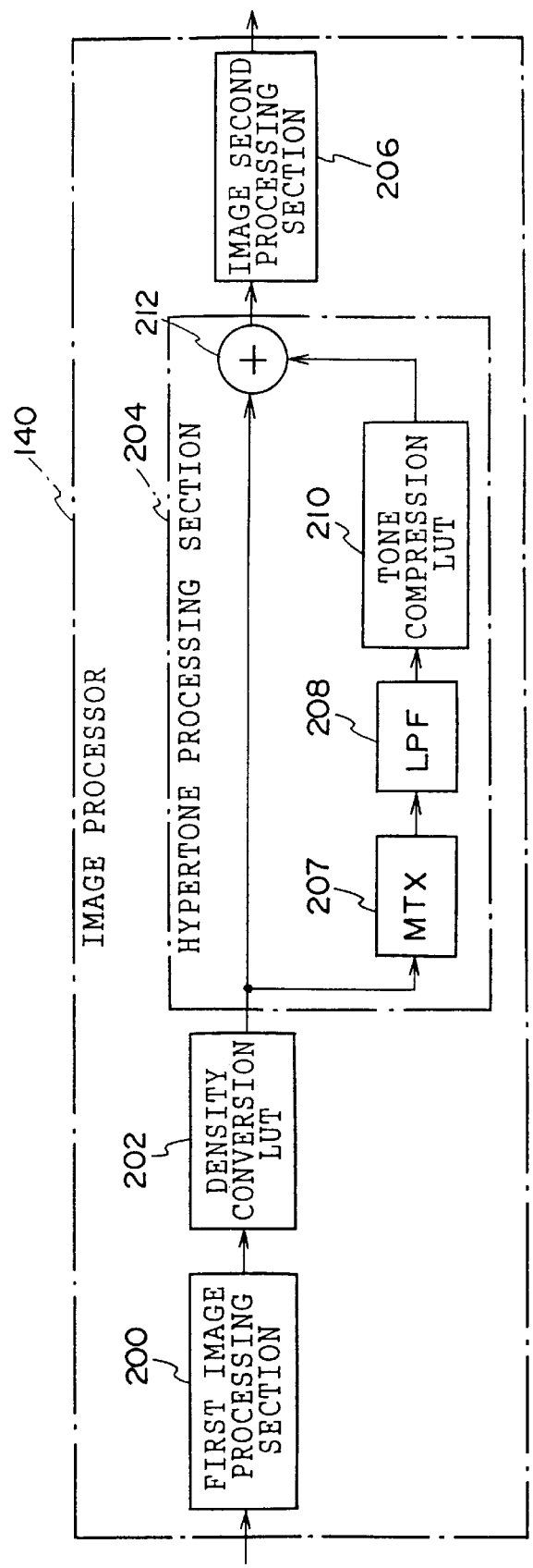
FIG. 4 is a block diagram showing a general structure of an image processor.

As shown in FIG. 4, the image processor 140 includes a first image processing section 200, a density conversion lookup table (LUT) 202, a hyper gradation processing section 204, and a second image processing section 206 for fetching the image data from the frame memory 142 and performing various image processings on the image data thus fetched. Specifically, the first image processing section 200 includes an expansion/compression circuit, a plurality of LUTs and a matrix calculation circuit (not shown) for performing various processings such as the expansion or compression of the image in accordance with the expansion-to-compression ratio determined by the auto setup calculation (described in detail later), standardization of the image data, and the correction of the color balance in accordance with the color balance correction conditions determined by the auto setup calculation.

The density conversion LUT 202 converts the density in accordance with the density conversion conditions (gradation change conditions) determined by the auto setup calculation to thereby correct the density and the contrast of the image represented by the image data. The density conversion processing corresponds to a specific image processing according to the present invention, and the density conversion conditions correspond to the processing conditions of the specific image processing.

The hyper gradation processing section 204 includes a matrix calculation circuit (MTX) 207, a low-pass filter (LPF) 208, a gradation compression LUT 210 and an adder 212. The hyper gradation processing section 204 determines the brightness component V (=(R+G+B)÷3) through the MTX 207, extracts the low-frequency component of the image from the brightness component V (whereby the low-frequency brightness component of the image (corresponding to the low-frequency component in the third aspect) is extracted) through the LPF 208, compresses (soft gradation enhancement) the gradation of the extracted low-frequency brightness component through the gradation compression LUT 210 in accordance with the gradation compression conditions determined by the auto setup calculation, and adds the low-frequency brightness component with the gradation compressed to the original image data through the adder 212. As a result, hyper gradation processing is performed to compress the gradation of the low-frequency brightness component of the image.

The second image processing section 206 includes an image processing circuit such as a hyper sharpness processing circuit and a LUT. In accordance with the processing conditions (degree of intensification) determined by the auto setup calculation, the second image processing section 206 performs the hyper sharpness process, for intensifying the sharpness while suppressing the graininess, and performs gradation conversion for assuring the same appearance when the image is recorded on a recording material as when the image is displayed on a display unit 164.

The processing conditions for the image processings described above are automatically calculated by an auto setup engine 144 (described later) corresponding to the calculating means according to the present invention, and the image is processed according to the processing conditions thus calculated. The image processor 140 is connected to an input/output controller 134. The image data thus processed are stored temporarily in a frame memory 142 and then output to the input/output controller 134 at a predetermined time. The image processor 140 corresponds to the image processing means according to the present invention. The image processor section 136B has the same structure as the image processor section 136A described above and therefore will not be described.

According to the present embodiment, each film image is read by the line CCD scanner 14 twice at different resolutions. In the first reading session with a comparatively low resolution (hereinafter referred to as the prescan), the entire surface of the photographic film is read under the read conditions (the light amount for each wavelength range of R, G, B of the light irradiated onto the photographic film, the charge storage time of the line CCD) determined in such a manner as not to cause saturation of the storage charge in the line CCD even in the case where the density of the film image is very low (an underexposed negative image in the negative film, for example) The data thus obtained by the prescan (prescan data) is inputted to the input/output controller 134 from the selector 132 and is further output to the auto setup engine 144 connected to the input/output controller 134.

The auto setup engine 144 includes a CPU 146, a RAM 148 (a DRAM, for example), a ROM 150 (for example, a ROM whose stored contents are rewritable), and an input/output port 152. These component parts are connected to each other through a bus 154.

The auto setup engine 144 determines the frame position of the film image based on the prescan data input thereto from the input/output controller 134, and extracts the data (the prescan image data) corresponding to the area where the film image is stored on the photographic film. The auto setup engine 144 also determines the size of the film image, calculates an image feature amount (such as the density) based on the prescan image data, and determines the conditions for the line CCD scanner 14 reading again with a comparatively high resolution (hereinafter referred to as the fine scan) The frame position and the reading conditions are output to the line CCD scanner 14.

The auto setup engine 144 also calculates the image processing conditions for the image data (fine scan image data) that the line CCD scanner 14 obtains by the fine scan, based on the prescan image data for the film images of a plurality of frames. The processing conditions thus calculated are output to the image processor 140 of the image processor section 136.

In calculating the image processing conditions as described above, it is determined from the feature amounts such as the exposure amount at the time of photographing, the light source used for photographing, etc. whether there are a plurality of film images in which a similar scene has been photographed. In the case where there are a plurality of film images which are photographs of a similar scene, the same or similar image processing conditions are determined for the image processing for the fine scan image data of these film images.

The optimum processing conditions for a given image processing scheme vary depending on whether the image data which has been subjected to image processing are used for recording the image onto a photographic paper in the laser printer section 18 or are output to an external unit. The image processing section 16 includes two image processor sections 136A, 136B. For example, in the case where the image data are used for recording the image onto a photographic paper and are output to an external unit, the auto setup engine 144 calculates the Optimum processing conditions for each application, and outputs them to the image processor sections 136A, 136B. The image processor sections 136A, 136B subject the same fine scan image data to image processings under different processing conditions.

Further, the auto setup engine 144 calculates the image recording parameters for specifying the gray balance, etc . in recording the image on the photographic paper by the laser printer section 18 based on the prescan image data of the f film image input thereto from the input/output controller 134, and outputs it to the laser printer unit 18 at the same time as the recording image data (described later). Also, the auto setup engine 144 calculates the image processing conditions in similar fashion for the file image data input thereto from an external source.

The input/output controller 134 is connected to the laser printer section 18 through an I/F circuit 156. In the case where the processed image data are used for recording an image onto a photographic paper, the image data processed in the image processor section 136 are output to the laser printer section 18 as the recording image data through the I/F circuit. 156 from the input/output controller 134. The auto setup engine 144 is also connected to a personal computer 158. In the case where the processed image data are output to an external unit as an image file, the image data that have been processed in the image processor section 136 are output from the input/output controller 134 through the auto setup engine 144 to the personal computer 158.

The personal computer 158 includes a CPU 160, a memory 162, a display section 164 corresponding to the display means described in the second aspect of the present invention, a keyboard 166 corresponding to the input means according to the present invention (see FIG. 2 also for the display unit 164 and the keyboard 166), a hard disk 168, a CD-ROM driver 170, a conveying control section 172, an expansion slot 174 and an image compression/expansion section 176. These component parts are connected to each other through a bus 178. The conveying control section 172 is connected to a film carrier 38 set in the line CCD scanner 14 for controlling the conveying of the photo film by the film carrier 38. Also, in the case where an APS film is set in the film carrier 38, the conveying control section 172 is supplied with the information (such as the print size) read by the film carrier 38 from the magnetic layer of the APS film.

A driver (not shown), for reading/writing data from and onto a recording medium such as a memory card, and a communication control section, for communicating with other information processing equipment, are connected through the expansion slot 174 to the personal computer 158. The image data to be output to an external unit, which may be input from the input/output controller 134, is output to the external unit (such as the driver or the communication control unit) as an image file. If the file image data is input from an external unit through the expansion slot 174, the input file image data is output to the input/output controller 134 through the auto setup engine 144. In this case, the input/output controller 134 outputs the input file image data to the selector 132.

(Operation)

Next, operation of the image processing section 16 according to the first embodiment will be explained. A film image recorded on a photographic film is read by the line CCD scanner 14, and based on the scan data thus obtained, the image is recorded onto a photographic paper by the laser printer section 18.

As already explained, the film image recorded on the photographic film is read twice by the line CCD scanner 14 (prescan and fine scan). After the entire surface of the photographic film is prescanned by the line CCD scanner 14, the prescan data is input to the image processing unit 16, and the line scanner correction section 122 performs various operations on the prescan data input thereto, including dark correction, density conversion, shading correction and the correction of defective pixels.

Figure 5A:
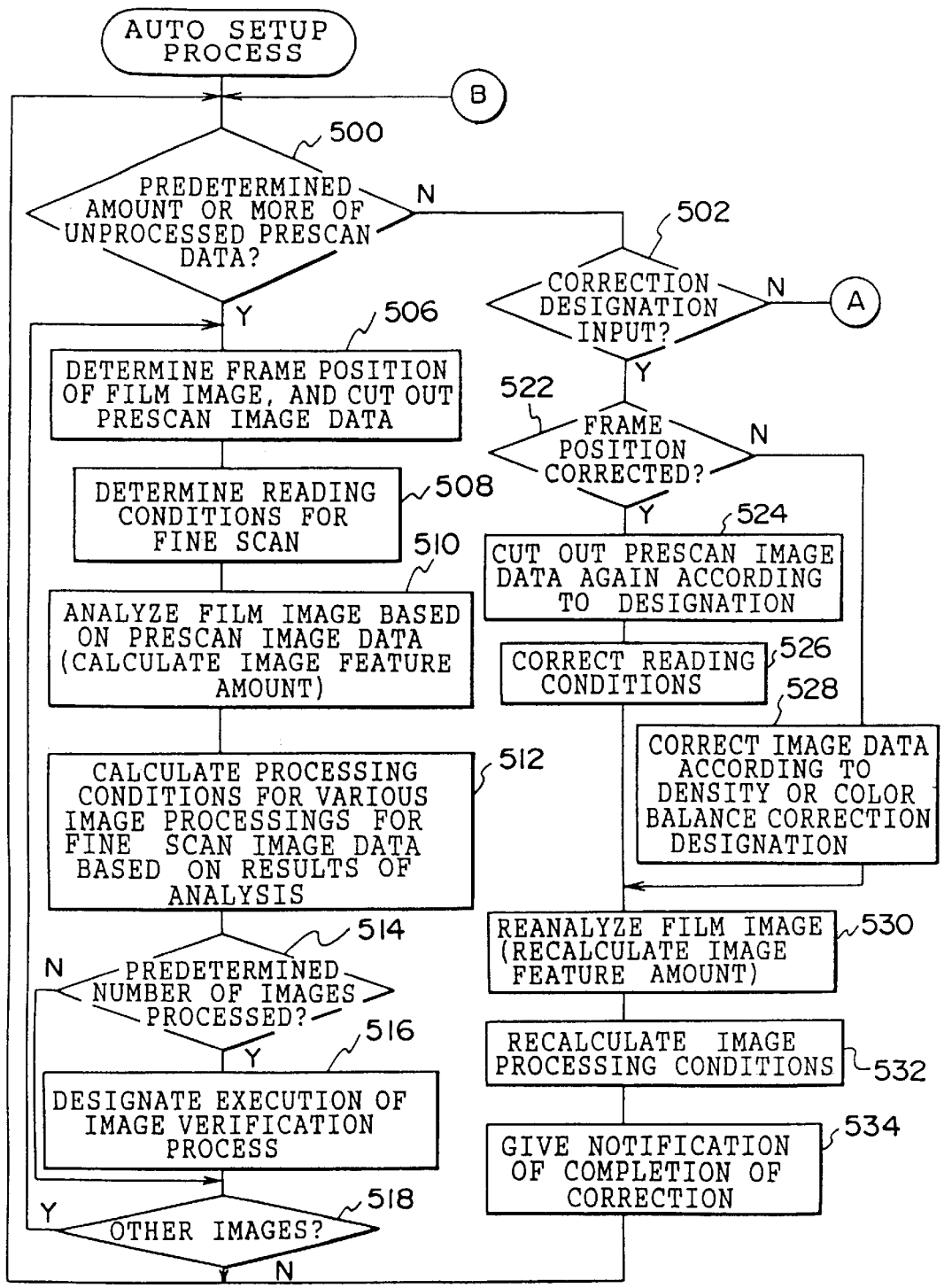
FIG. 5A is a flowchart showing an auto setup process executed by an auto setup engine.
Figure 5B:
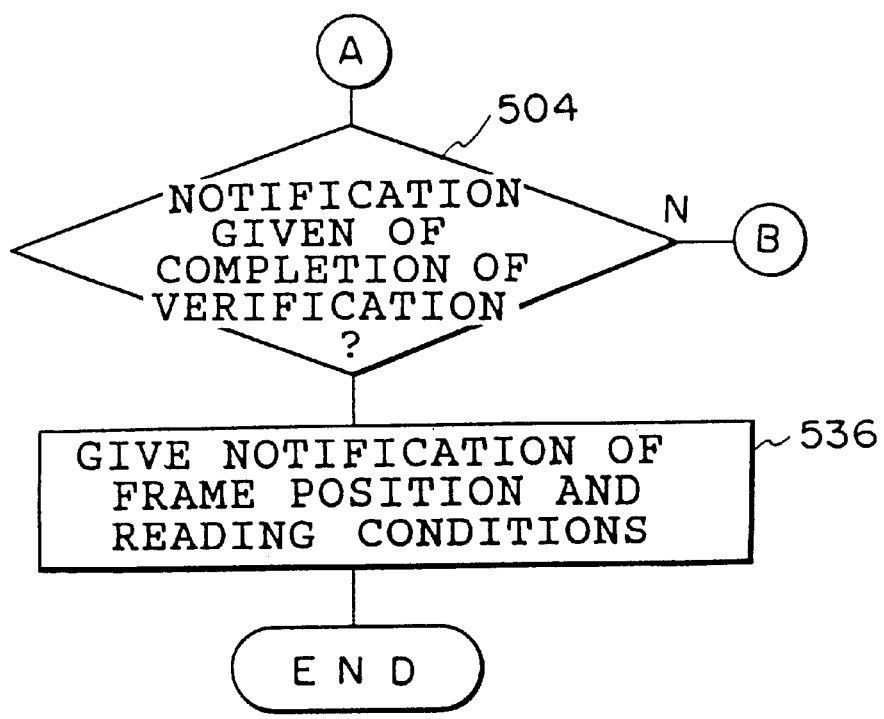
FIG. 5B is a flowchart showing an auto setup process executed by an auto setup engine.

The prescan data output from the line scanner correction section 122 is input through the selector 132 to the auto setup engine 144. The CPU 146 of the auto setup engine 144 causes the prescan data input thereto to be sequentially stored in the RAM 148 while at the same time performing the auto setup operation. Next, the auto setup process will be explained below with reference to the flowchart of FIG. 5.

In step 500, it is determined whether at least a predetermined amount of prescan data yet to be processed are accumulated in the RAM 148. In the case where the determination is negative, the process proceeds to step 502 for determining whether a correction designation (described in detail later) has been input from the personal computer 158. If this determination is also negative, the process proceeds to step 504 for determining whether the personal computer 158 has given notice of the end of verification (described in detail later) In the case where this determination is also negative, the process returns to step 500, and steps 500 to 504 are repeated until one of the determinations becomes affirmative.

Once at least a predetermined amount of prescan data yet to be processed is accumulated in the RAM 148, the determination in step 500 becomes affirmative, and the process proceeds to step 506. Based on the prescan data accumulated in the RAM 148, step 506 determines the position of the outer peripheral edge (frame position) of the film image recorded on the photo film 22. Then, the data (prescan image data) in the area with the film image recorded therein are fetch from the prescan data and stored in the RAM 148. Next, in step 508, the average density, etc. of the film image is calculated based on the prescan image data thus fetch, and based on the average density, etc. thus calculated, the conditions for reading the film image with high accuracy at the time of fine scan are determined. The reading conditions thus determined are stored in the RAM 148.

In step 510, the graininess of the film image is determined based on the prescan image data, and the film image is analyzed by calculating various feature amounts including the central density in the density range and the density histogram of the film image. In the next step 512, based on the results of the film image analysis, the processing conditions (more specifically, the parameters for defining the processing conditions) for the image processing executed in the image processor 140 are arithmetically determined. Examples of processing conditions for image processing include the expansion-to-compression ratio for image expansion/compression processing, the conditions for correcting the color balance in color balance correction processing, the density conversion conditions for density conversion processing, the gradation compression conditions for the low-frequency brightness component of hyper gradation processing, and the degree of intensification of the high-frequency and the low-frequency components of the image for hyper sharpness processing.

Figure 6:
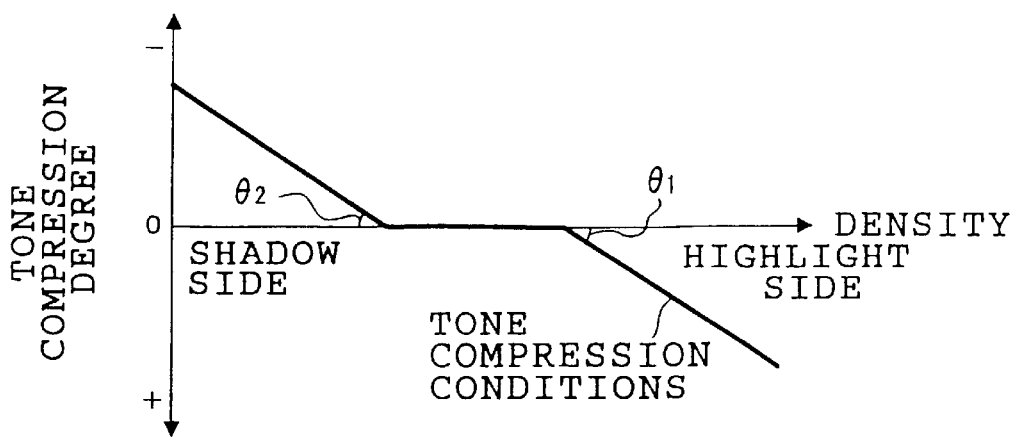
FIG. 6 is a diagram showing an example of the basic pattern of the gradation compression conditions for the low-frequency brightness component of the image in hyper gradation processing.

For example, gradation compression conditions for the low-frequency brightness component of the image in hyper gradation processing are determined in the following manner. Specifically, according to the present embodiment, as an example, a basic pattern of the gradation compression conditions as shown in FIG. 6 is prepared. In this basic pattern, the slope $\theta_1$ defining the gradation compression characteristic for the highlight part of the image and the slope $\theta_2$ defining the gradation compression characteristic for the shadow part of the image are used as parameters (variables).

Figure 7:
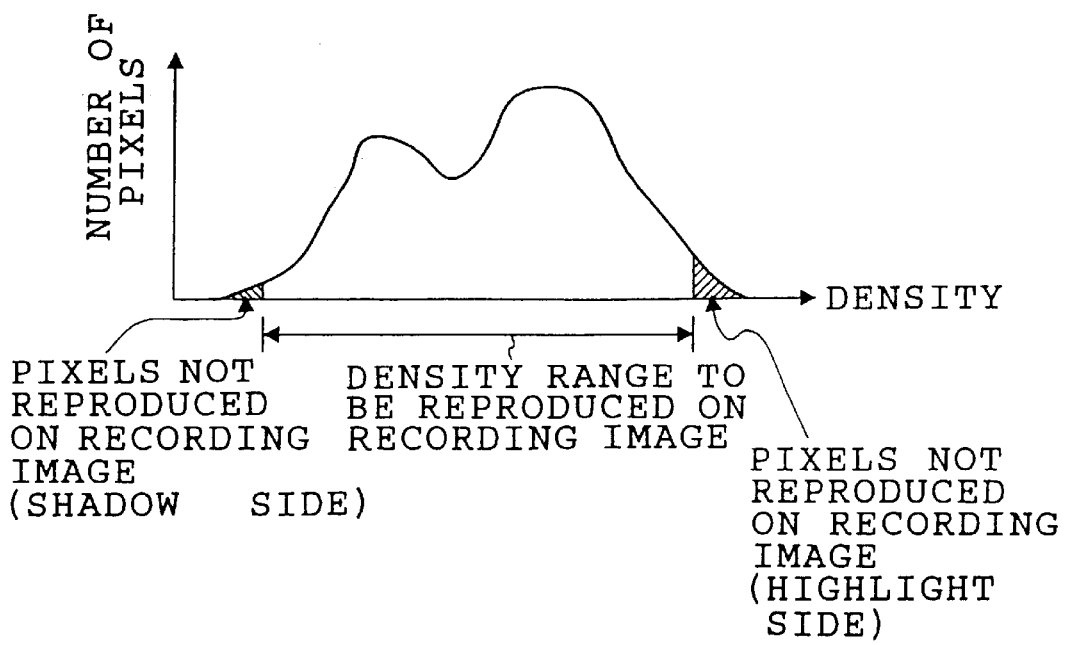
FIG. 7 is a diagram showing an example of a density histogram of a film image.
Figure 10:
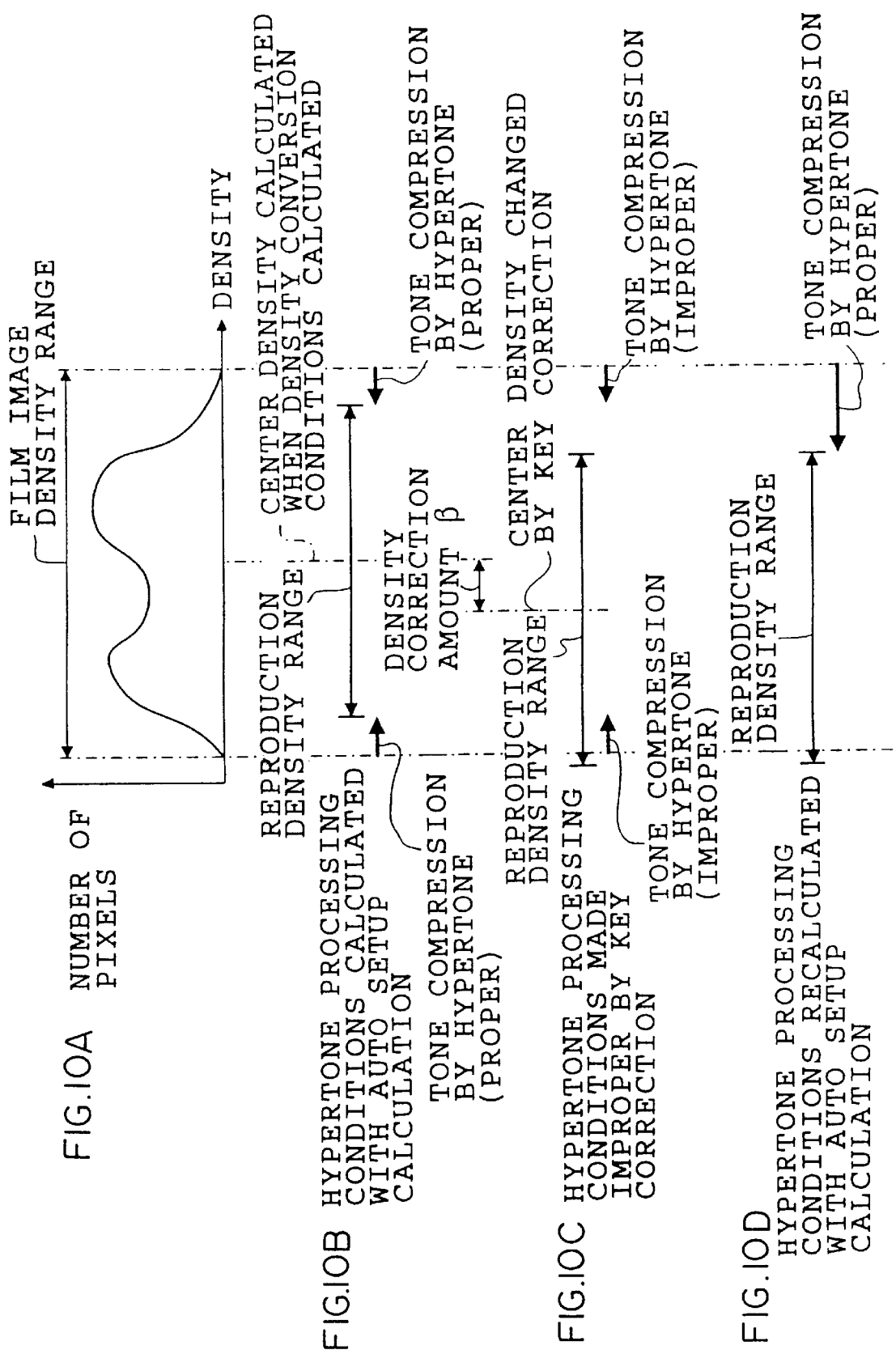
FIG. 10A is a diagram showing an example of a density histogram of a film image.
FIG. 10B is a diagram showing an example of the processing conditions for hyper gradation processing calculated by a first round of calculation.
FIG. 10C is a diagram showing an example of the processing conditions for hyper gradation processing determined to be improper by key correction.
FIG. 10D is a diagram showing an example of the recalculated processing conditions for hyper gradation processing.

The gradation compression conditions for hyper gradation processing set a density range to be reproduced as an image on the recorded image in the density histogram of the film image with reference to the center density of the film image calculated at the time of calculation of the density conversion conditions (FIG. 7). Then, the number of pixels offset from the density range thus set (the pixels that cannot be reproduced as an image due to a loss in gradation detail on the recorded image) is determined for each of the highlight and the shadow parts. Then, the slopes $\theta_1$ and $\theta_2$ described above are determined in such a manner that the gradation compressibility increases with the number of pixels inca- pable of being reproduced, i.e., in such a manner that the density range represented by the image data is included in the reproduced density range (FIGS. 10A, 10B). As a result, the gradation compression conditions (the processing conditions for hyper gradation processing) are determined in accordance with the contents of the film image.

The frame position is determined, the prescan image data is fetch, the reading conditions are determined, and the image processing conditions are calculated in the manner described above, and then the process proceeds to step 514 for determining whether the above-described processing has been executed on a predetermined number (say, about 6 frames) of film images. In the case where the determination is negative, the process proceeds to step 518 for determining whether other film images are contained in the unprocessed prescan data accumulated in the RAM 148. In the case where the determination is affirmative, the process returns to step 506, and steps 506 to 518 are repeated. In the case where the determination is negative, in step 518, the process returns to step 500 and steps 500 to 504 are repeated. Once a predetermined amount or more of unprocessed prescan data are accumulated in the RAM 148 again, the determination in step 500 becomes affirmative, and steps 506 to 518 are repeated.

Figure 8A:
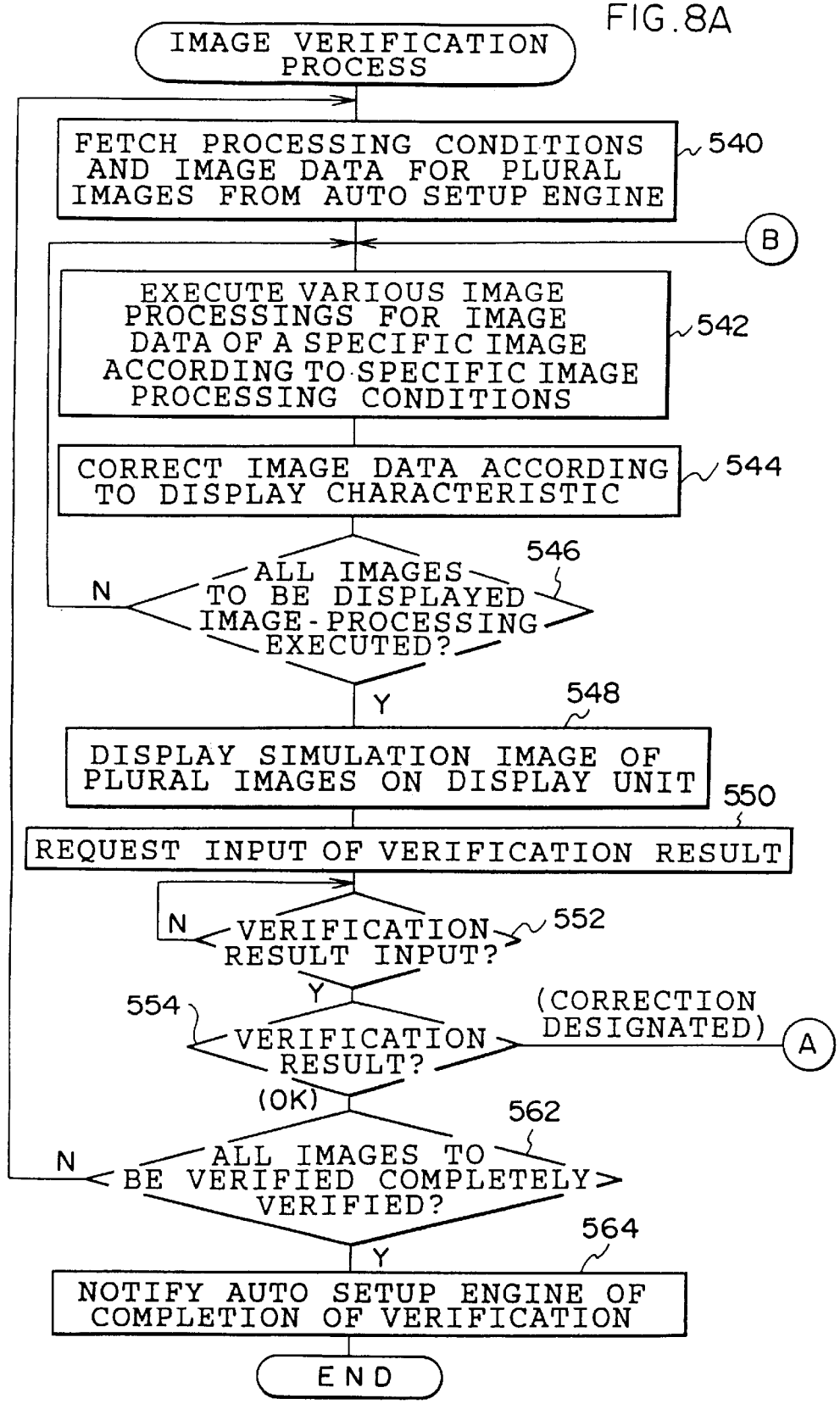
FIG. 8A is a flowchart showing image verification processing executed by a personal computer.

When the prescan image data are fetch and the reading conditions are determined and the image processing conditions are calculated for a predetermined number of film images, the determination in step 514 is affirmative. In step 516, the personal computer 158 is instructed to execute the image verification process, and thereafter, the process proceeds to step 518. As a result, the CPU 160 of the personal computer 158 executes the image verification process. The image verification process will be explained below with reference to the flowchart of FIG. 8.

In step 540, the prescan image data for a predetermined number of film images and the image processing conditions are fetched from the auto setup engine 144, and the prescan data corresponding to the range in which the predetermined number of the film images are recorded on the photographic film to be read are fetched. In the next step 542, from among the fetched prescan image data and image processing conditions of the predetermined number of film images, the prescan image data and image processing conditions of one film image are fetched, and the prescan image data thus fetched are subjected to a predetermined image processing (image expansion/compression processing, color balance correction processing, density conversion processing, hyper gradation processing, hyper sharpness processing, or the like.) in accordance with the processing conditions fetched.

In the next step 544, the image data processed are corrected in accordance with the characteristics of the display 164 for displaying the image, and the corrected data (simulation image data) are temporarily stored in the memory 162. In step 546, it is determined whether a predetermined number of film images have been processed as described above. In the case where the determination is negative, the process returns to step 542, and steps 542, 544 are repeated for the unprocessed film images of the predetermined number of the film images for which the prescan image data and the processing conditions were fetched in step 540.

Figure 9:
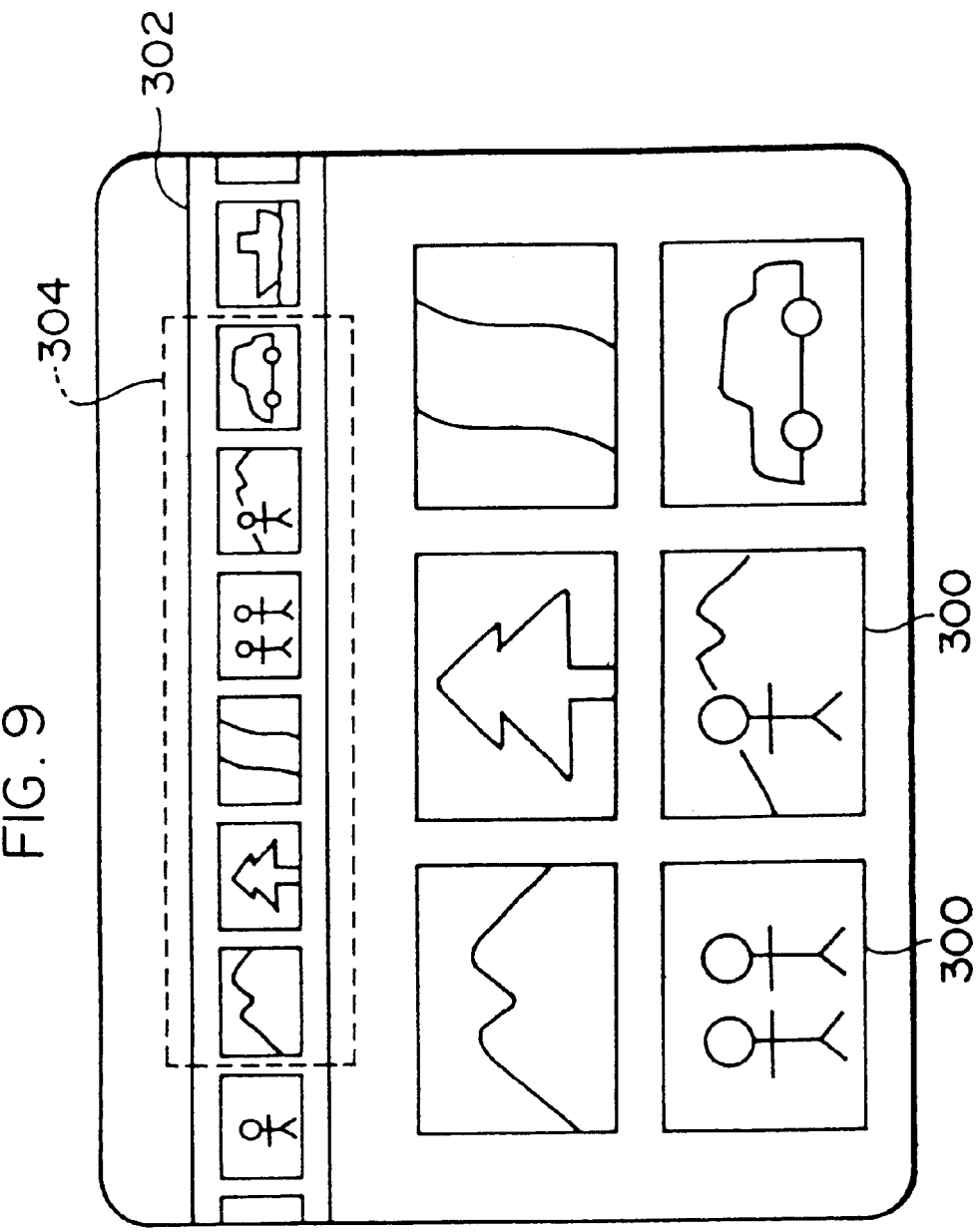
FIG. 9 is a diagram showing an example of simulation images displayed on the display unit.

If the determination in step 546 is affirmative, the process proceeds to step 548, where the range in which the predetermined number of film images are recorded on the photographic film 22 to be read is displayed on the display 164 as an image 302 as shown in FIG. 9, for example, by using the prescan data fetched previously in step 540. At the same time, based on the simulation image data of the predetermined number of film images, a predetermined number of simulation images 300 which express the results of the image processing performed for the image data of the predetermined number of film images according to the processing conditions set in the auto setup engine 144, are displayed on the display 164.

In FIG. 9, the film image corresponding to the displayed simulation image 300 is displayed within a frame 304 on the photographic film displayed as an image 302. Steps 542 to 548 described above correspond to the display control means described in the second aspect of the present invention. In the next step 550, by, for example, a message requesting the operator to verify the simulation image being displayed on the display unit 164, the operator is requested to verify the simulation image.

In this way, the operator visually checks the simulation image displayed on the display unit 164, and carries out various determinations, and carries out the verification work of inputting the result of determinations. Specifically, it is determined whether the frame position of the film image determined by the auto setup engine 144 is proper, and in the case where the frame position is determined to be proper, the quality of the simulation image (especially, the density and the color balance of the important part area) is verified, and it is determined whether the image quality is proper (i.e., whether the processing conditions calculated by the auto setup engine 144 are proper).

In the case where the frame position and the image quality of all the simulation images on display are determined to be proper, information expressing "VERIFICATION OK" is entered through the keyboard 166 as the results of verification. In the case where the frame position of a specific simulation image is determined to be not proper, a key on the keyboard 166 designating the direction of movement of the frame position is pressed, so that the information designating the correction of the frame position of the specific simulation image is entered through the keyboard 166 as the results of verification. In the case where it is determined that the image quality of a specific simulation image is not proper, the key designating a change in density (the average density of three colors) or a change in density of a specific component color (one of C, M or Y, for example) is pressed so that information designating the correction of the density or the correction of the color balance of the specific simulation image (corresponding to "the information designating a change in the processing conditions of the specific image processing" in the present invention) is input through the keyboard 166 as the results of verification.

As compared with, for example, parameters defining the processing conditions for various image processings, the density and the color balance used as parameters for designating the correction of the image quality allow for easy recognition for operator of what type of effect the change in the parameter value will have on the image quality. Unlike cases where the processing conditions for various image processings are corrected directly by the operator, the operator can determine easily within a short time the extent to which the density or the color balance is to be corrected, in the case where the image quality is determined to be improper.

In the next step 552, it is determined whether the results of verification have been input by the operator through the keyboard 166, and if not, the input of the verification results is awaited. When results of verification are inputted, the process proceeds to step 554 for determining the contents of the information input as the results of verification. In the case where the information designating the correction of the density or the color balance or the correction of the frame position is input as the results of verification for a specific film image corresponding to a specific simulation image, the process proceeds to step 556 where the correction designation which was inputted for a specific film image is output to the auto setup engine 144. In step 558, it is determined whether the auto set up engine 144 has given notification of the completion of the correction of the processing conditions or the frame position of the specific film image. If no such notification has been given, an affirmative determination is awaited.

When the correction designation described above is input, the determination in step 502 of the auto setup process (FIG. 5) becomes affirmative in the auto setup engine 144, and the process proceeds to step 522 for performing the correction in response to the correction designation which was inputted. Specifically, step 522 determines whether the correction designation input from the personal computer 158 is a correction designation for the frame position. In the case where the determination is affirmative, the process proceeds to step 524, where the frame position of the specific film image is corrected in accordance with the correction designation. Thereafter, in step 526, as in step 508 described above, the prescan image data are fetch again from the prescan data in accordance with the corrected frame position, and based on the prescan image data thus fetch, the read conditions for fine scan are corrected.

In the case where the inputted correction designation is a correction designation which designates correction of the density or the color balance of the specific film image, the determination of step 522 is negative, and the process proceeds to step 528, where the prescan image data is corrected in accordance with the inputted designation for correcting the density or the color balance, as the case maybe. specifically, in the case where a designation for correcting the density is input, the prescan image data is corrected in such a way that the density of each pixel represented by the prescan image data shifts by a predetermined value corresponding to the correction designation. In the case where a designation for correcting the color balance is input, the prescan image data is corrected independently for the data of each component color in such a manner that the color balance of each pixel represented by the prescan image data shifts in accordance with the correction designation.

After the process of step 526 or 528 has been carried out, the routine proceeds to step 530, where as in step 510 described above, the image analysis including the calculation of the image feature amounts is performed again based on the prescan image data (or based on the prescan image data corrected in accordance with the correction designation in step 528 in the case where a correction designation for the density or the color balance is input). In thenext step 532, as in step 512 described above, the processing conditions for the image processing executed in the image processor 140 are recalculated based on the results of the repeated analysis of the film image. Steps 530, 532 correspond to the recalculation of the processing conditions by the calculating means according to the present invention.

As described above, according to the present embodiment, in response to the input of the designation for correcting the density or the color balance, the prescan image data is corrected in accordance with the correction designation, and based on the prescan image data thus corrected, the image analysis such as the calculation of the image feature amounts is performed again, and the processing conditions of various image processings are recalculated. Therefore, even in the case where the various image feature amounts of the image undergo a change by correcting the density or the color balance of the image in accordance with a designation for correcting the density or the color balance, respectively, the processing conditions for various image processings can be changed and set to those reflecting the change of the image feature amounts.

Figure 11:
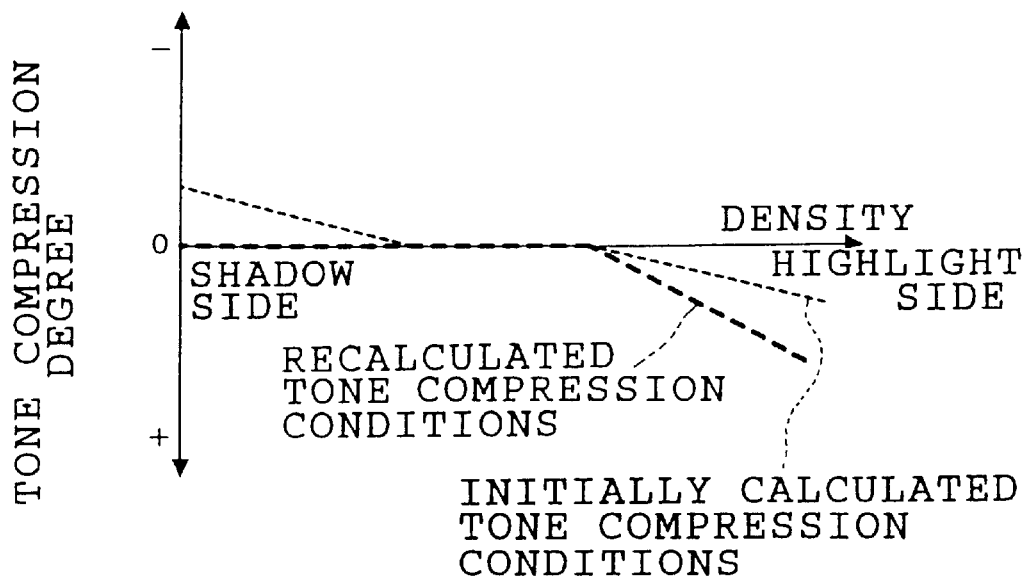
FIG. 11 is a diagram showing an example of the gradation compression conditions for hyper gradation processing obtained by the initial calculation and an example of the gradation compression conditions for hyper gradation processing obtained by recalculation.

As an example, consider the case in which a density range (reproduction density range) to be reproduced as an image on the recorded image is set, for the density histogram of the film image shown in FIG. 10A, on the basis of the center density of the film image as shown in FIG. 10B, in the first auto setup calculation (steps 506 to 512 in the auto setup process of FIG. 5), and in which the gradation compression conditions (also refer to the gradation compression conditions indicated as "the initially calculated gradation compression conditions" in FIG. 11) for compressing the gradation as shown by the thick arrow in FIG. 10B are determined as the processing conditions for the hyper gradation processing.

In the case where the designation for correcting the image density by a correction amount β is inputted, as shown in FIG. 10C, the positions of the film image density area and the reproduction density area change relative to each other (FIG. 10C shows that the film image density area is as a reference) As a result, under the gradation compression conditions determined by the first auto setup calculation, the density range, represented image data, after processed hyper gradation processing deviates considerably from the reproduction density range of the image data so that the number of pixels not reproduced on the recorded image increases. In such a case, conventionally, the operator would be required to perform the complicated job of correcting the processing conditions for the hyper gradation processing directly in such a manner as to assure proper processing conditions for the hyper gradation processing.

In contrast, in accordance with the present embodiment, the prescan image data is corrected in such a manner as to shift the film image density range by a correction amount β, and the processing conditions for the hyper gradation processing are recalculated based on the density histogram and the center density determined from the corrected prescan image data. Thus, it is possible to automatically obtain the gradation compression conditions (see also the gradation compression conditions shown as "the recalculated gradation compression conditions" in FIG. 11) for compressing the gradation as indicated by the thick arrow in FIG. 10D, i.e., to automatically obtain proper processing conditions reflecting the inputted density correction designation.

Figure 12:
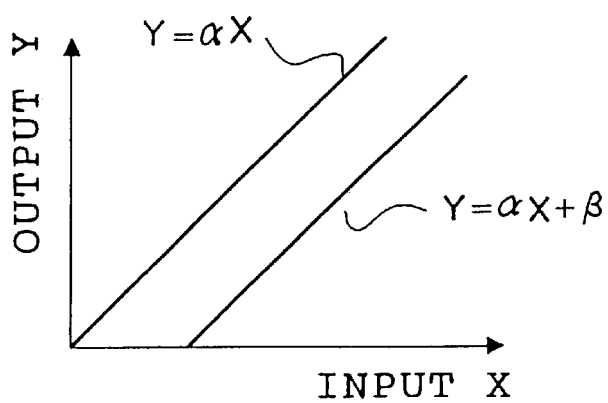
FIG. 12 is a diagram showing an example of the density conversion conditions.

In the case where a designation for correcting the density or the color balance is input, the correction designation is reflected in the density conversion conditions (gradation change conditions). The density conversion conditions are determined for each component color, and the density is converted for each component color separately. As an example, given that the density conversion conditions for each component color before input of the correction designation have the conversion characteristic as shown in FIG. 12 and that as $Y=^{\alpha}X$ (X is an input, and Y an output), in the case where a designation is input for correcting the image density by the correction amount β, the density conversion conditions are corrected so as to have the conversion characteristic of $Y=^{\alpha}X+\beta$.

After recalculation of the processing conditions for an image processing as described above has been completed, the processing conditions (parameters) obtained by recalculation are stored in the RAM 148 or the like in step 534. At the same time, the completion of the correction of the processing conditions or the frame position for the specific film image is notified to the personal computer 158, and the process returns to step 500 and steps 500 to 504 are repeated.

Upon receipt of notification of the completion of correction of the frame position or the processing conditions from the auto setup engine 144, the determination in step 558 of the image verification process (FIG. 8) becomes affirmative at the personal computer 158, and the process proceeds to step 560. The prescan image data and the processing conditions for a specific film image whose frame position and processing conditions have been corrected are fetched from the auto setup engine 144, and the process returns to step 542.

As a result, the processes of steps 542, 544 are executed again for the specific film image whose frame position and processing conditions have been corrected, so that a simulation image of the specific film image is displayed again on the display unit 164. The operator visually checks the simulation image of the specific film image thus redisplayed, whereby it becomes possible for the operator to easily determine whether the contents of the previously inputted correction designation are proper.

The processes of steps 542 to 560 are repeated until the frame position and the image quality of all the simulation images displayed on the display unit 164 are determined to be proper by the operator, and also until the information indicating "VERIFICATION OK" is input as the results of verification (i.e., until the determination of step 554 becomes affirmative). Thus, the frame position and the processing conditions for each film image corresponding to the displayed simulation image are corrected in accordance with the designation from the operator. When the operator inputs the information indicating "VERIFICATION OK" through the keyboard 166 and the determination in step 554 is affirmative, the process proceeds to step 562.

In step 562, it is determined whether all the film images to be verified (all the film images recorded on the photographic film 22 to be read) have been verified. In the case where the determination is negative, the process returns to step 540, and step 540 and subsequent steps are repeated. As a result, all the film images recorded on the photographic film 22 to be read are verified as described above in units of a predetermined number of film images, and it is determined whether the frame position and the processing conditions determined in the auto setup engine 144 are proper, and at the same time, the frame position and the processing conditions are corrected as needed. When the determination in step 562 becomes affirmative, the completion of the verification process is notified to the auto setup engine 144 in step 564, thereby ending the image verification process.

In the auto setup engine 144, upon receipt of the notification of completion of the image verification process, the determination in step 504 of the auto setup process (FIG. 5) becomes affirmative, and the process proceeds to step 536. Thus, the frame positions and the reading conditions of all the film images recorded on the photographic film 22 to be read are notified to the line CCD scanner 14, thereby ending the auto setup process.

Upon completion of prescanning for the photographic film, on the other hand, the line CCD scanner 14 performs fine scanning whereby the photographic film is read for each film image in accordance with the reading conditions of the individual film images notified from the auto setup engine 144. In the process of the fine scanning, the auto setup engine 144 notifies the image processor unit 136 of the processing conditions of the image processing for the fine scan image data determined for each film image by the auto setup process described above.

Once each film image of the photo film is fine scanned by the line CCD scanner 14, the image processing unit 16 is supplied with the fine scan image data. The line scanner correction unit 122 then subjects various processes including dark correction, density conversion, shading correction and the correction of defective pixels to the input fine scan image data. The fine scan image data, for which these various processes have been completed, are inputted through the selector 132 to the image processor unit 136. The fine scan image data then are variously processed according to the processing conditions calculated by the auto setup process (FIG. 5) and verified by the image verification process (FIG. 8) in the first image processing section 200, the density conversion LUT 202, the hyper gradation processing section 204 and the second image processing section 206 of the image processor section 140. Then outputted to the laser printer portion 18.

Figure 13A:
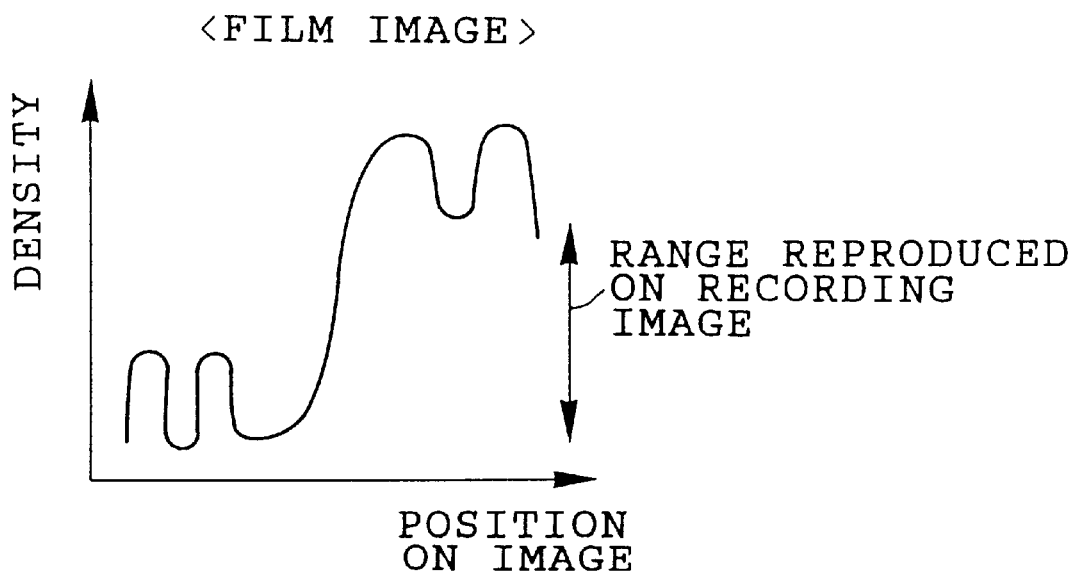
FIG. 13A is a diagram showing an example of the density distribution of a film image.
Figure 13B:
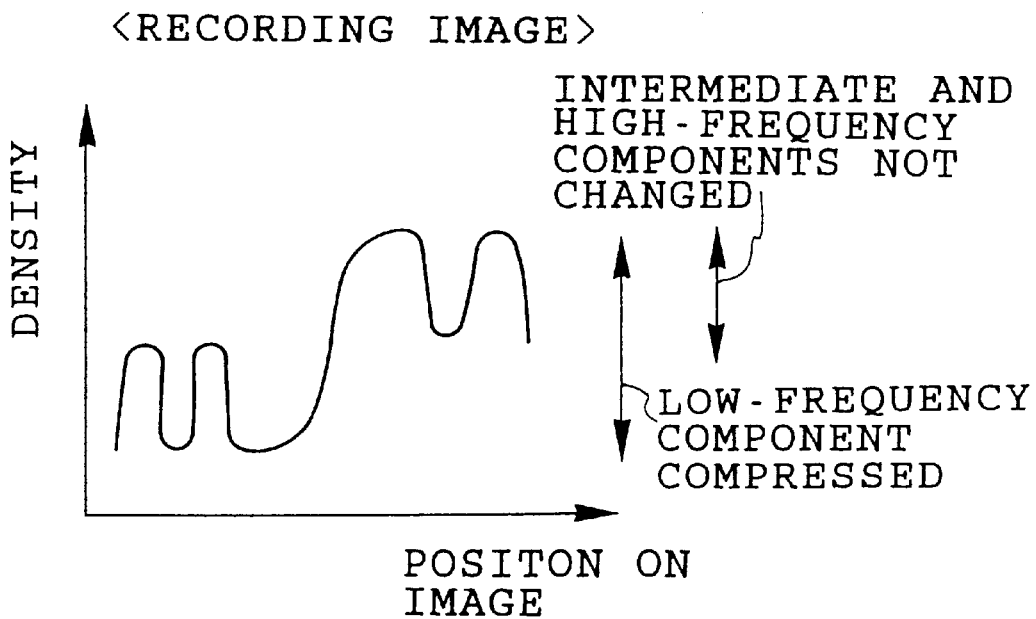
FIG. 13B is a diagram showing an example of the density distribution of an image recorded on a recording material after the image data has been subjected to hyper gradation processing.

For example, a film image photographed by using a flash or a film image which is a photographed backlit scene has an excessively high contrast as shown in FIG. 13A. If the image is simply recorded as a recorded image, a loss in gradation detail occurs in the background area on the recorded image. However, in the hyper gradation processing carried out by the hyper gradation processing section 204, as shown in FIG. 13B, the a loss in gradation detail in the background area is suppressed by compressing (softening) the gradation only for the low-frequency brightness component. Thus, it is possible to obtain a recorded image of proper image quality in which the gradation for the intermediate frequency component and the high frequency component is held (is not processed).

In the case where the correction of the density or the color balance is designated in the image verification process, the processing conditions for the hyper gradation processing are recalculated in a manner reflecting the correction designation, and hyper gradation processing is carried out in accordance with the processing conditions obtained by the recalculation. Thus, even a film image for which proper processing conditions cannot be obtained by the auto setup calculation can be subjected to hyper gradation processing under proper processing conditions, thereby producing a recorded image of proper quality.

Second Embodiment

Next, a second embodiment of the invention will be explained. The second embodiment has the same structure as the first embodiment. Therefore, the same component parts are designated by the same reference numerals, respectively, and will not be described. Only the parts of the operation of the second embodiment which differ from those of the first embodiment will be explained below.

Figure 14B:
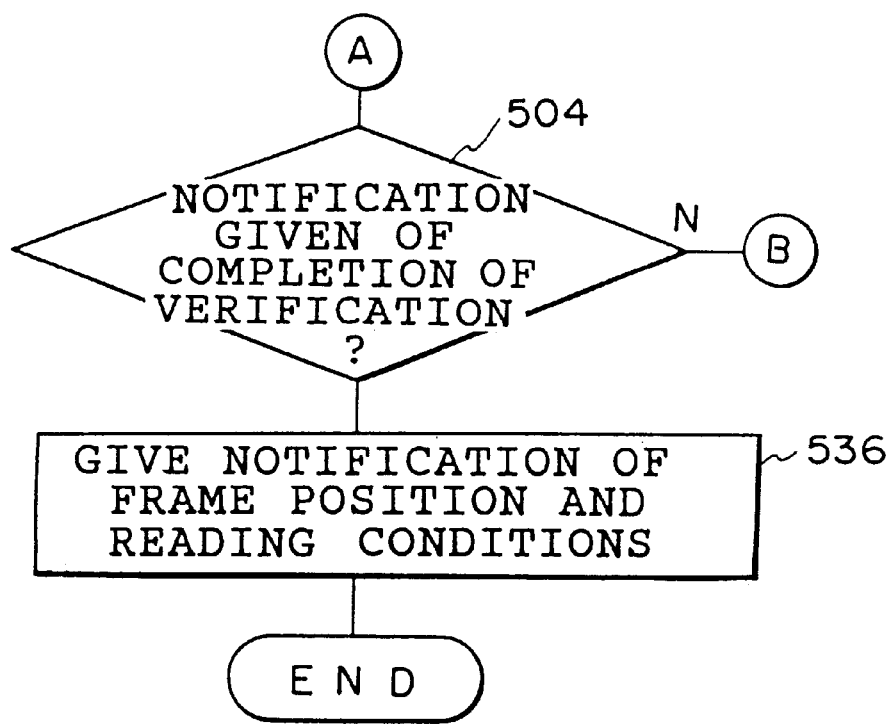
FIG. 14B is a flowchart showing auto setup processing according to a second embodiment.

In the auto setup process (FIG. 14) according to the second embodiment, step 510 determines the graininess of the film image as the film image analysis, calculates the image feature amounts such as the center density in the density range of the film image or the density histogram, and extracts the important part area in the film image. The area of the important part area can be, for example, the area corresponding to a human face in the image.

Examples of extraction methods for extracting the face area estimated to correspond to a human face in the image include a human face area extraction method in which an area estimated to correspond to a human face in an image is determined and the particular area is extracted as a face area, and a background removal method in which an area (background area) estimated to correspond to the background of an image is determined and the area other than the background area is extracted as a face area. The face area extraction process can be executed by employing any one of various well-known methods. The face area thus extracted can be considered to be the important part area.

The extraction of the important part area described above corresponds to the detecting means according to the fourth aspect of the invention (more specifically, "said detection means detects the important part area of the image by analyzing the image and estimating the important part area of the image" as described in the sixth aspect of the invention). In the next step 511, information on the important part area indicating the position, shape, size, etc. of the important part area extracted is set on the basis of the results of extraction of the important part area in step 510, and the process proceeds to step 512.

Figure 15A:
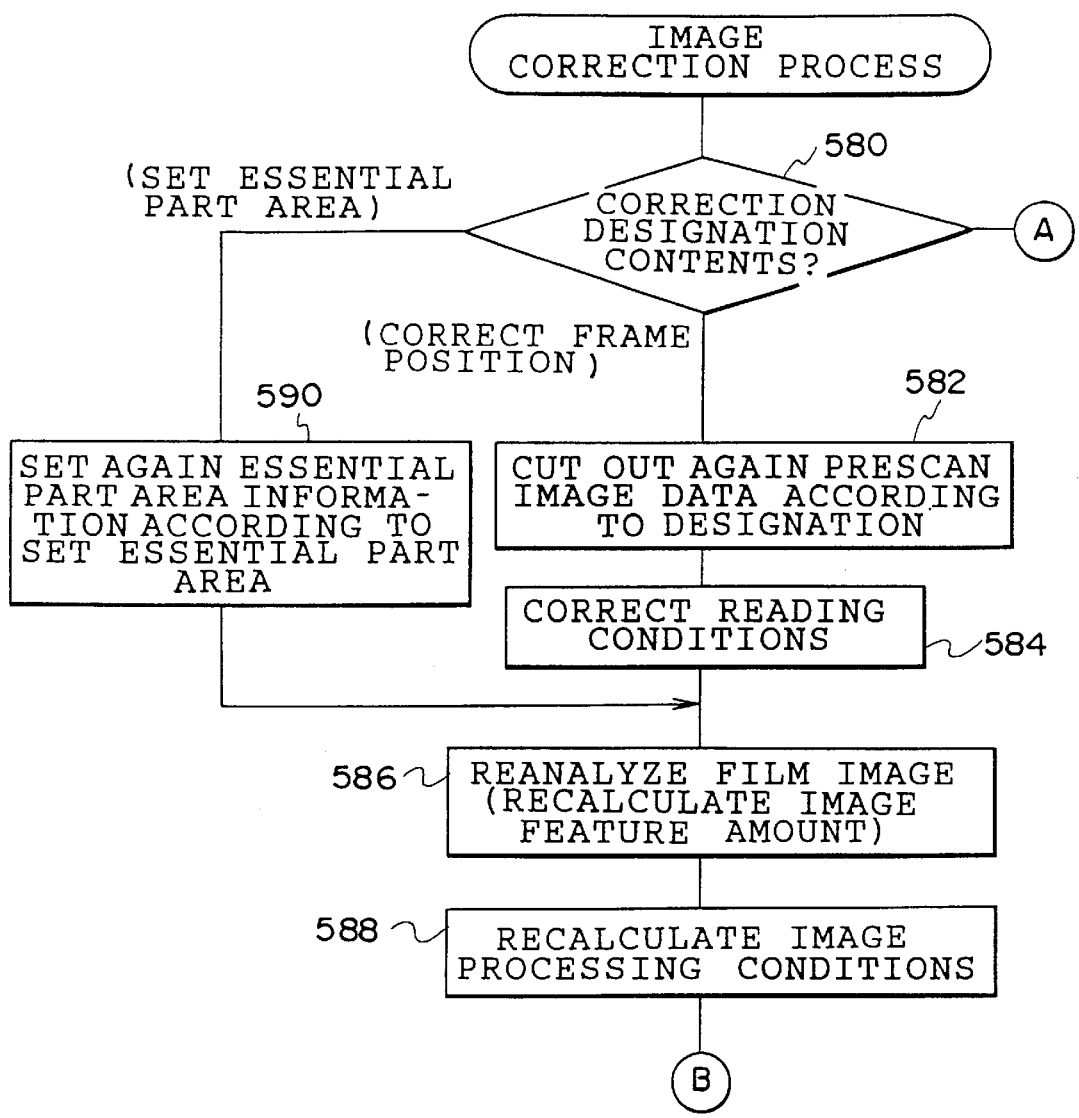
FIG. 15A is a flowchart showing image correction processing according to the second embodiment.

Also, in the auto setup process according to the second embodiment, when the correction designation is input from the personal computer 158 and the determination in step 502 is negative, in step 520, image correction processing is performed. This image correction processing will be explained with reference to the flowchart of FIG. 15.

In step 580, the contents of the correction designation inputted from the personal computer 158 are checked. In the case where the correction designation is a designation for correction of the frame position, the process proceeds to step 582. As in steps 524, 526, 530, 532 of the flowchart of FIG. 5 described in the first embodiment, the frame position of a specific film image is corrected and the prescan image data is fetch again (step 582), and based on the prescan image data thus fetch, the reading conditions for fine scan are corrected (step 584). The image analysis including the calculation of the image feature amounts is performed again (step 586), and the processing conditions for an image processing are calculated again (step 588).

In step 610, the processing conditions (parameters) obtained by recalculation are stored in the RAM 148 or the like, and the personal computer 158 is notified of the completion of the correction of the frame position for a specific film image, thereby ending the image correction processing. (The routine returns to step 500 in the flowchart of FIG. 14, and step 500 and subsequent steps are repeated).

In the case where the inputted correction designation input is a density correction designation for correcting the density of a specific film image (or a corresponding simulation image), the process proceeds from step 580 to step 592. In step 592, the information on the important part area of the specific film image is fetched, and the density (average density), which is represented by the important part area information, of the important part area on the film image represented by the prescan image data is detected.

The keyboard 166 has, as keys for designating the density correction (the density correction keys), two keys whose directions of density correction are different from each other (increase/decrease). The density correction is designated by carrying out verification in such a manner that the density of the displayed simulation image (especially, the important part area), and in the case where the density is different from the desired density, a key to be operated is selected according to the direction of density correction, and the selected key is pressed the number of times corresponding to the magnitude of the deviation from the desired density.

According to the second embodiment, the amount of the change in density achieved by one pressing of the density correction key is preset. The density change amount designated by the density correction designation, however, is set in such a manner that the output image density (especially, the density of the important part area) becomes proper based on the results of verifying the simulation image representing the finished output image (the image appearing on the photographic paper by being exposed-recorded onto the photographic paper). The density change amount is affected by the nonlinearity of the "exposure amount vs. coloring density" characteristic of the photographic paper. Thus, this density change amount does not always coincide with the density change amount on the image data representing the film image.

For this reason, in step 594, based on the density of the important part area detected in step 592 above, a density target for the important part area on the film image represented by the prescan image data is calculated for changing, in accordance with the density correction designation, the density of the important part area on the simulation image corresponding to the specific film image.

Figure 16:
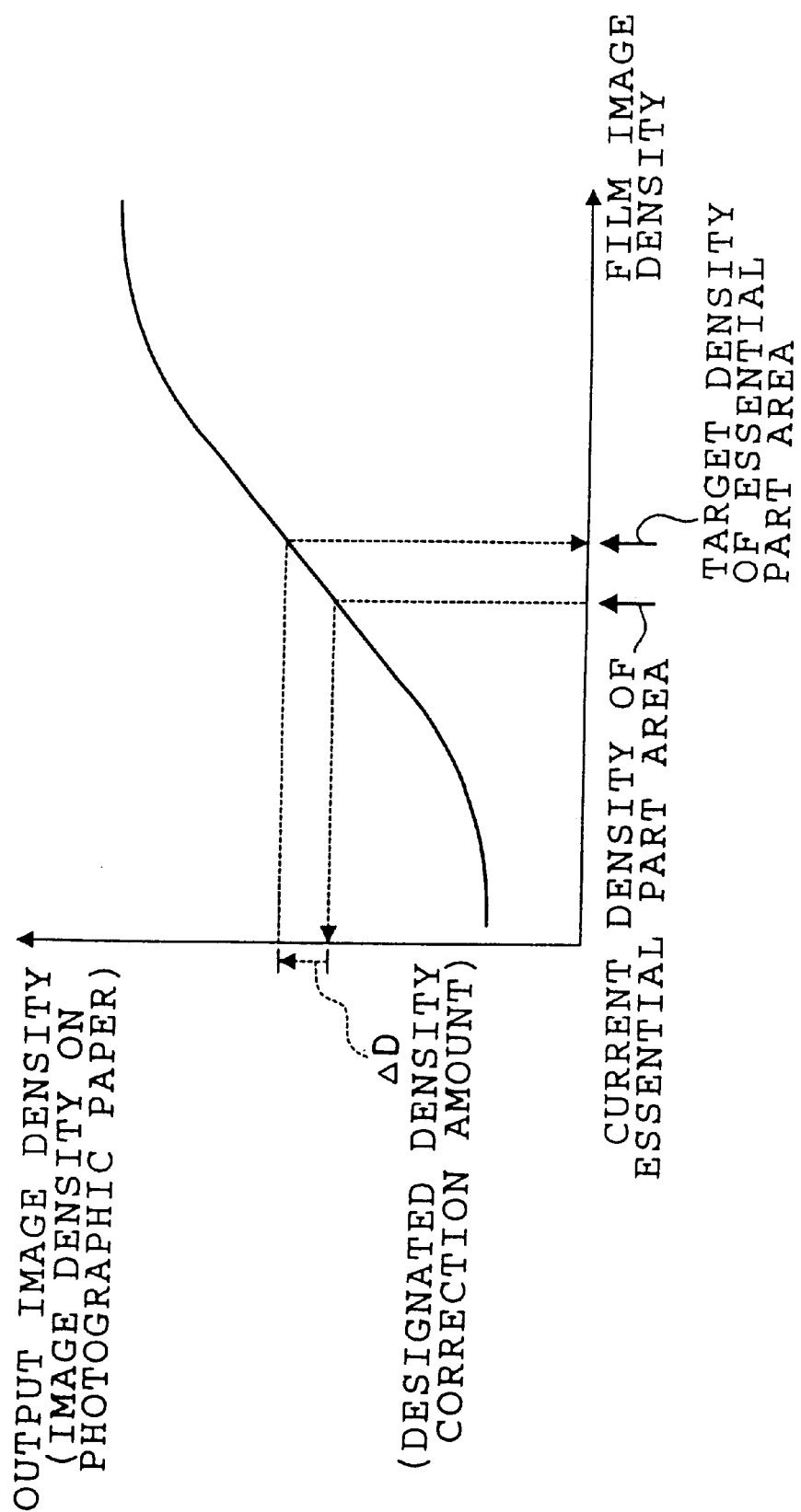
FIG. 16 is a diagram showing the relationship between the film image density and the output image density for explaining the calculation of a target value of the density of the important part area on the film image.

Specifically, the density of the important part area on the prescan image data is converted into a density value on the output image (simulation image) based on the relationship (determined according to the "exposure amount vs. coloring density" characteristic of the photographic paper) between the density of the film image and the output image density (image density on the photographic paper) as shown in FIG. 16. Then, the density value after conversion is changed by a designated correction amount (indicated by $^\Delta$D in FIG. 16, for example), and thereafter, changed density value is inversely converted into the density on the prescan image data. As a result, a target density value for the important part area on the film image represented by the prescan image data is determined.

In the next step 596, the density conversion conditions for the prescan image data are set in such a manner that the density of each pixel represented by the prescan image data shifts by a density amount corresponding to the difference between the density of the important part area detected in step 592 above and the target density value for the important part area determined in step 594 above. In step 598, according to the density conversion conditions set in step 596, the density conversion process is carried out so as to convert the prescan image data. Thus, the density of the important part area on the film image represented by the density-conversion-processed prescan image data provisionally coincides with the target value.

In step 600, the image analysis (except for the extraction of the important part area) including the calculation of the image feature amounts is carried out again as in steps 510, 528, 586 described above for the prescan image data which has been converted according to the density conversion conditions. In step 602, as in steps 512, 532, 588 described above, the processing conditions (including to the gradation compression conditions for hyper gradation processing, which correspond to the gradation change conditions described in the fourth aspect) for various image processings including hyper gradation processing (corresponding to the gradation change processing in the fourth aspect) executed in the image processor 140 are calculated again based on the results of the repeated analysis of the film image.

In step 604, in accordance with the processing conditions obtained by recalculation in step 602, the prescan image data subjected to the density conversion processing in step 598 are processed in a manner equivalent to the image processing executed in the image processor 140. In step 604, an image processing having no effect on the density of the important part area can be eliminated.

Hyper gradation processing, which is one of the image processings executed in step 604, compresses the gradation of the low-frequency brightness component of the image in accordance with the gradation compression conditions. Therefore, when hyper gradation processing is carried out, the density of the image represented by the prescan image data partially and unevenly changes as compared with the state before the hyper gradation processing. As a result, in the next step 606, the density of the important part area on the image represented by the prescan image data is detected, and the difference is calculated between the detected density of the important part area and the target density value of the important part area. In step 608, it is determined whether the difference is less than a predetermined value.

In the case where the difference between the detected and target densities of the important part area is not less than the predetermined value, if the density conversion processing and the hyper gradation processing are executed in accordance with the current density conversion conditions and the current gradation compression conditions, even the density of the important part area on the output image considerably differs from the density of the important part area assumed by the operator who input the density correction designation. Thus, in the case where the determination in step 608 is negative, the process returns to step 592, so that, based on the difference target and detected of the densities of the important part area calculated in step 606, the current density conversion conditions are corrected in such a manner that the density of the important part area coincides with the target value.

Upon completion of the process of step 596, as previously described, the processes of step 598 and subsequent steps (recalculation of the image processing conditions, etc.) are executed sequentially. Until the determination in step 608 becomes affirmative, the processes and determination in steps 596 through 608 are repeated. In this way, the difference in the densities of the important part area calculated in step 606 gradually decreases. Thus, the density conversion conditions set in step 596 and the gradation compression conditions calculated in step 602 can be converged to proper conditions under which the density of the important part area coincides with the target value and the density range of the image represented by the image data is prevented from deviating considerably from the reproduction density range.

Steps 592 to 608 correspond to the calculating means according to the fourth aspect of the invention. More specifically, the initial execution of steps 598 to 602 in the loop of steps 596 to 608 corresponds to "changes the density conversion conditions in accordance with the designation for changing the density conversion conditions, reanalyzes the image to be processed by changing the density by a predetermined amount for the image data representing the image to be processed, and recalculates the gradation change conditions for the gradation change processing based on the results of analysis" described in the fifth aspect of the invention.

Steps 604 to 608, correspond to "determining the density of the important part area of the image corresponding to the image data that have been subjected to the density conversion process and the gradation change process" as described in the fifth aspect, and determining that "the period during which the change amount of the density of the important part area comes to substantially coincide with a predetermined value". Also, the second and subsequent executions of steps 596 to 602 correspond to "repeating the process of changing the density conversion conditions, analyzing the image to be processed and recalculating the gradation change conditions" according to the fifth aspect.

When the determination in step 608 is affirmative, the process proceeds to step 610, and the processing conditions (parameters) for various image processings including the density conversion conditions and the gradation compression conditions are stored in the RAM 148 or the like. Thereafter, the completion of the density correction process for the specific film image is notified to the personal computer 158 together with the processing conditions, thereby ending the image correction processing. (The process returns to step 500 in the flowchart of FIG. 14 and the processes including and subsequent to step 500 are repeated.)

The personal computer 158 performs various image processings on the prescan image data of the specific film image according to the processing conditions notified from the auto setup engine 144, and displays it again as a simulation image on the display unit 164. Therefore, the density of the important part area of the simulation image thus redisplayed (corresponding to "the image corresponding to image data which has been subjected to the density conversion processing after density conversion" described in the fourth aspect) substantially coincides with the density of the important part area assumed by the operator who has input the density correction designation. In this way, the operator does not feel a sense of incongruity.

Even if the operator presses the density correction key a plurality of times while checking the change of density in the important part area of the simulation image displayed on the display unit 164 to adjust the density of the important part area to the desired value, the amount of the change in density in the important part area achieved by each pressing of the density correction key is substantially equal to the present density change amount. Therefore, the operator adjusting the density of the important part area is prevented from having a feeling a sense of incongruity, and can easily carry out the job of adjusting the density of important part area to the desired value.

After the hyper gradation processing is performed on the image data, unlike before the hyper gradation processing, the density of the image represented by the image data changes unevenly in different portions. In the process described above, the density of the important part area of the simulation image is controlled to change by a density change amount corresponding to the inputted density correction designation. Therefore, for area other than the important part area, the density change amount does not always coincide with the density change amount corresponding to the density correction designation. Thus, in the case where the important part area extracted in step 510 of the auto setup process (FIG. 14) fails to coincide with the area determined by the operator to be the important part area, the operator may have a feeling a sense of incongruity since the density change amount of the important part area upon one pressing of the density correction key appears to be different from the preset density change amount.

Therefore, in the image verification process, when the operator presses the density correction key while checking the change of density in the important part area of the simulation image in order to adjust the density of the important part area to the desired value, if the operator determines that the density change amount in the important part area of the simulation image is different from the preset density change amount, the operator inputs through the keyboard 166 the information which he himself selects for setting the important part area (information designating the position of the important part area, or the like).

When the operator inputs the information for setting the important part area, in step 556 of the image verification process (FIG. 8), the information for setting the important part area input from the operator is output to the auto setup engine 144 as a correction designation. In the auto setup engine 144, in step 580 of the image correction process (FIG. 15), it is determined that the contents of the correction designation are that the important part area is to be set, and the process proceeds to step 590 where the information on the important part area is set again in accordance with the information input from the operator. Then steps 586, 588, 610 are executed in that order. Step 590 corresponds to the detection means in the fourth aspect of the invention (more specifically, "detecting as the essential part area of the image an area which is designated through said input means" described in the sixth aspect).

As a result, when the operator presses the density correction key again for adjusting the density of the important part area to the desired value, the density change amount of the important part area upon a single pressing of the key substantially coincides with the preset density change amount. As examples, FIG. 17A shows the image density change when the density correction key is pressed in the case where an area corresponding to a human figure in the foreground (appearing to be located in the foreground) in the image is set as the important part area, and FIG. 17B shows the image density change when the density correction key is pressed in the case where an area corresponding to a human figure in the background (appearing to be located in the background) in the image is set as the important part area.

As is clear from the comparison between FIGS. 17A and 17B, each time the density correction key is pressed (in the drawing, "+1" indicates that the key for increasing the density is pressed once, and "−1" indicates that the key for decreasing the density is pressed once), the density changes at a preset rate (in the drawing, the density change amount is 0.1) for the area set as the important part, whereas the density change amount is not constant for the other areas (the area corresponding to the human figure not set as the important part area or the area corresponding to the mountain in the far background).

Even for an image whose important part area is difficult to extract properly in a case where an attempt is made to automatically estimate and extract the important part area (for example, as in a case of an image in which a totally unrelated person exists at the foreground side of a building which is photographed as the important portion), the density of the important part area can be easily adjusted to the desired density by operating the density correction key after designating the important part area manually. Also, since the important part area can usually be extracted automatically, labor can be saved as compared with the case where the operator is required to designate the important part area each time.

The foregoing description refers to a case using the keyboard 166 as the input means. However, the present invention is not limited to such means, and in place of the keyboard 166, a pointing device such as a mouse or a digitizer can be used as the input means.

In the aforementioned embodiments, in the case where a designation for correcting the density or the color balance of a film image is input, the image is analyzed again and the processing conditions of various image processings are recalculated. However, the present invention is not limited to such a method, and the processing conditions may be recalculated only for an image processing (for example, hyper gradation processing) in which the proper processing conditions undergo a considerable change when the density or the color balance is corrected.

Although the second embodiment describes a case in which hyper gradation processing is used for the gradation change processing of as the fourth aspect of the invention, the present invention is not limited to such a method. Instead, for example, the position, shape and the size of a skin-colored area in an unfocused image obtained by extracting only the low-frequency component of the original image may be detected, whereby an area corresponding to a human face in the original image is recognized. The face area thus recognized is subjected to a process for improving the face expression in which the density or the like is changed. In this way, the gradation in the low-frequency area of the image is changed, so that the density of the important part area may change. The fourth aspect of the invention is of course applicable to the image processing described above for improving the face expression.

Further, according to the second embodiment, in the case where the density correction key is pressed, the density change amount for the important part area of the simulation image (output image) is controlled to coincide with a preset density change amount. As an alternative, the density change amount can be set directly by the operator.

Also, the second embodiment describes a case in which the density correction designation is input and the gradation change process is carried out in view of the fact that the density of the image changes to a comparatively large degree in certain portions when a gradation change processing such as the hyper gradation processing is carried out. However, the gradation change processing also somewhat changes the color balance of the image. The color balance correction designation is input as a designation for increasing or decreasing a specific component color density by a predetermined amount. Therefore, in the case where a color balance correction designation is input and the gradation change processing is carried out, a structure may be utilized in which each component color density for the important part area is detected, a target density for each component color is set based on the color balance correction designation, and setting of the color balance conversion conditions (which can be structured by the density conversion conditions determined for each component color) and recalculation of the gradation change conditions are repeated in such a manner that each component color density for the important part area coincides with a corresponding target value.

In carrying out the density conversion processing and the gradation change processing, it is also possible for the results of automatic extraction of the important part area to be displayed on a display means and for the operator to check whether the important part area has been properly extracted, and in the case where it is determined that the important part area is erroneously extracted, the operator designates the important part area.

Also, in the foregoing embodiments, the film image recorded on the photographic film is read by the line CCD scanner and the resulting image data is processed. Alternatively, in the image processing method according to the present invention, image data obtained by reading an original other than a film image (such as a reflection original) by the scanner, image data obtained by photographing by using a digital camera, or image data generated by a computer can also be processed with the same excellent effects.

The embodiments of the invention described above include the following embodiment in addition to those described in the appended aspects.

(1) An image processing apparatus according to the first aspect, wherein the calculating means analyzes an image and calculates the processing conditions based on prescan image data obtained in a preliminary reading in which a film image recorded on a photofraphic film is preliminarily read at a predetermined resolution, and the image processing means carries out image processing of the fine scan image data obtained in an official reading process by which the film image is read at a resolution higher than the predetermined resolution.

As described above, according to the first and seventh aspects of the invention, the processing conditions for plural types of image processings are calculated based on the results of image analysis, and according to the processing conditions thus calculated, a plurality of image processings are carried out on the image data. In the case where information is input for designating a change in the processing conditions of a specific image processing, the image is analyzed again in such a manner as to reflect the designation for changing the processing conditions, and the processing conditions for at least one image processing other than the specific image processing are recalculated based on the result of analysis. Thus, proper image processing conditions, which may not be able to be easily obtained automatically, can be obtained by a simple operation.

According to the second aspect of the invention, the image data are subjected to plural types of image processings according to the processing conditions calculated in the first aspect of the invention, and the image represented by the image data thus processed is displayed on the display means. Therefore, in addition to the above-mentioned advantages, the processing time can be reduced.

According to the third aspect of the invention, in the first aspect, if information, which designates a change in the density conversion conditions in such a manner that the density of the image represented by the image data which has been subjected to density conversion processing changes by a predetermined amount, is inputted, the density of the image data is changed by a predetermined amount, the image is analyzed again, and the gradation compression conditions for hyper gradation processing are recalculated based on the results of analysis. Therefore, in addition to the advantages described above, even in the case where there is a designation to change the density conversion conditions in such a manner that the density after the density conversion process has been carried out changes by a predetermined amount, proper processing conditions for hyper gradation processing can be obtained, and the proper quality of the image represented by the image data which has been subjected to image processing can also be attained.

According to the fourth aspect of the invention, in the first aspect, if there is a designation to change the density conversion conditions in such a manner that the density of the image corresponding to the density-conversion-processed image data changes by a predetermined amount, the density conversion conditions for the density conversion processing are changed and the gradation change conditions for the gradation change processing are recalculated, so that the density of the important part area of the image corresponding to the image data subjected to the density conversion processing and the gradation change processing changes by a predetermined amount. Therefore, in addition to the advantages described above, a change in the density conversion conditions can be easily designated in order to adjust the density of the important part area of the image to the desired value. Thus, the operator is prevented from having a feeling of a sense of incongruity and the operation is not complicated.

What is claimed is:

1. An image processing apparatus comprising:

calculating means for analyzing an image and for, based on the results of analysis, calculating processing conditions for plural types of image processings for image data representing the analyzed image;

image processing means for performing each of the plural types of image processings on inputted input image data in accordance with the processing conditions calculated by said calculating means; and input means for inputting information designating a change in at least one processing condition of the specific image processing among the processing conditions calculated by said calculating means, wherein in a case in which the information designating a change in the at least one processing condition of the specific image processing is input through said input means, said calculating means changes the at least one processing condition of the specific image processing, analyzes the image again in such a manner as to reflect a designation of the change in the at least one processing condition of the specific image, and recalculates at least one processing condition of at least one image processing other than the specific image processing on the basis of the results of analysis.

2. An image processing apparatus according to claim 1, further comprising:

display means for displaying an image; and display control means for performing the plural types of image processings on image data representing the image in accordance with the processing conditions calculated by said calculating means, and displaying on said display means the image represented by the processed image data.

3. An image processing apparatus according to claim 1, wherein the plural types of image processings include density conversion processing for converting the density of the image represented by the image data in accordance with density conversion condition, and hyper gradation processing for compressing the gradation of low-frequency component of the image in accordance with gradation compression condition, and wherein in a case in which information, which designates a change in said density conversion conditions in such a manner that the density of the image represented by the image data which has been subjected to the density conversion processing changes by a predetermined amount, is input through said input means, said calculating means changes the density by a predetermined amount for the image data representing the image to be processed, reanalyzes the image to be processed, and recalculates the gradation compression condition for hyper gradation processing based on the results of analysis.

4. An image processing apparatus according to claim 1, further comprising means for detecting an important part area of an image, wherein said image processing means performs the plural types of image processings including density conversion processing for converting the density of the image represented by the image data in accordance with density conversion condition, and gradation change processing for changing the gradation of the image in accordance with gradation change condition, and wherein in a case in which information, which designates a change in the density conversion conditions in such a manner that the density of the image corresponding to the image data which has been subjected to the density conversion processing changes by a predetermined amount, is input to said calculating means through said input means, said calculating means changes the density conversion condition for the density conversion processing and recalculates the gradation change condition for the gradation change processing in such a manner that the density of the important part area of the image corresponding to the image data which has been subjected at least to the density conversion processing and the gradation change processing changes by said predetermined amount.

5. An image processing apparatus according to claim 4, wherein said calculating means changes the density conversion condition in accordance with the designation for changing the density conversion condition, reanalyzes the image processed by the density conversion processing so as to change the density by a predetermined amount for the image data representing the image to be processed, and recalculates the gradation change condition for the gradation change processing based on the results of analysis, and thereafter, said calculating means determines the density of the important part area of the image corresponding to the image data subjected to the density conversion processing and the gradation change processing, and, until the density change amount of the important part area substantially coincides with said predetermined amount, said calculating means repeats the processes of changing the density conversion condition, analyzing the image to be processed, and recalculating the gradation change condition, in order for the density change amount of the important part area to substantially coincide with said predetermined amount.

6. An image processing apparatus according to claim 4, wherein said detection means detects the important part area of the image by analyzing the image and estimating the important part area of the image, or detects as the important part area of the image an area which is designated through said input means.

7. An image processing method comprising the steps of:

analyzing an image and, on the basis of the results of analysis, calculating processing conditions for plural types of image processings for image data representing the analyzed image;

carrying out the plural types of image processings on inputted image data in accordance with the calculated processing conditions; and upon receipt of information designating a change in the calculated processing condition for a specific image processing, changing the processing conditions for said specific image processing, reanalyzing the image in such a manner as to reflect the designation to change the processing conditions, and on the basis of the results of analysis, recalculating the processing conditions for at least one image processing other than said specific image processing.

* * * * *